(12) United States Patent
Onizawa et al.

(10) Patent No.: US 6,608,863 B1
(45) Date of Patent: Aug. 19, 2003

(54) COHERENT DETECTION SYSTEM FOR MULTICARRIER MODULATION

(75) Inventors: Takeshi Onizawa, Kanagawa (JP); Masato Mizoguchi, Kanagawa (JP); Tomoaki Kumagai, Kanagawa (JP); Tetsu Sakata, Kanagawa (JP); Masahiro Morikura, Kanagawa (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 09/506,076

(22) Filed: Feb. 16, 2000

(30) Foreign Application Priority Data

Feb. 18, 1999 (JP) .......................... 11-039721
Mar. 16, 1999 (JP) .......................... 11-070398
Oct. 25, 1999 (JP) .......................... 11-302184
Oct. 25, 1999 (JP) .......................... 11-302186

(51) Int. Cl.$^7$ .......................... H03H 7/30; H03H 7/40; H03K 5/159

(52) U.S. Cl. .......................... 375/232; 375/325

(58) Field of Search .......................... 375/232, 144, 375/148, 325, 340; 455/59

(56) References Cited

U.S. PATENT DOCUMENTS 6,188,717 B1 * 2/2001 Kaiser et al. ................ 375/148
6,219,334 B1 4/2001 Sato et al. .................... 370/210

FOREIGN PATENT DOCUMENTS

JP 10-257013 9/1998
JP 2000-286821 10/2000

OTHER PUBLICATIONS

Peter Hoeher,; "TCM on Frequency–Selective Land–Mobile Fading Channels"; Coded Modulation and Bandwidth–Efficient Transmission; pp. 317–328; 1992.

Sarah Kate Wilson, et al.; "16 QAM Modulation with Orthogonal Frequency Division Multiplexing in a Rayleigh–Fading Environment"; IEEE; pp. 1660–1664; 1994.

Ove Edfors, et al.; "OFDM Channel Estimation by Singular Value Decomposition"; IEEE Transactions On Communications; vol. 46, No. 7; pp. 931–939; Jul. 1998.

Vittoria Mignone, et al.; CD3–OFDM: "A Novel Demodulation Scheme for Fixed and Mobile Receivers"; IEEE Transactions On Communications; vol. 44, No. 9; pp. 1144–1151, Sep. 1996.

* cited by examiner

Primary Examiner—Mohammad H. Ghayour
(74) Attorney, Agent, or Firm—Armstrong, Westerman & Hattori, LLP

(57) ABSTRACT

A coherent detection system for multicarrier modulation system capable of accurate channel estimation even in severe environment with high thermal noise and deep multipath fading, has been found with simple structure and small circuit size. The present coherent detection system comprises a channel estimation circuit (208) for estimating a channel attenuation of a preamble part of each subcarriers, an adaptive filter (210, 211) for smoothing estimated channel attenuation among subcarriers, a divider (213) for coherent detection of a data part by dividing a receive vector by smoothed estimated channel attenuation for each subcarriers, and a characteristic extraction circuit (209) for extracting characteristic value of each subcarriers. The adaptive filter (210, 211) is controlled depending upon characteristic value of each subcarriers measured by the characteristic extraction circuit (209). A characteristic value may be amplitude, phase rotation, vector difference, modulation system, of each subcarriers, and/or combination of those values.

14 Claims, 19 Drawing Sheets

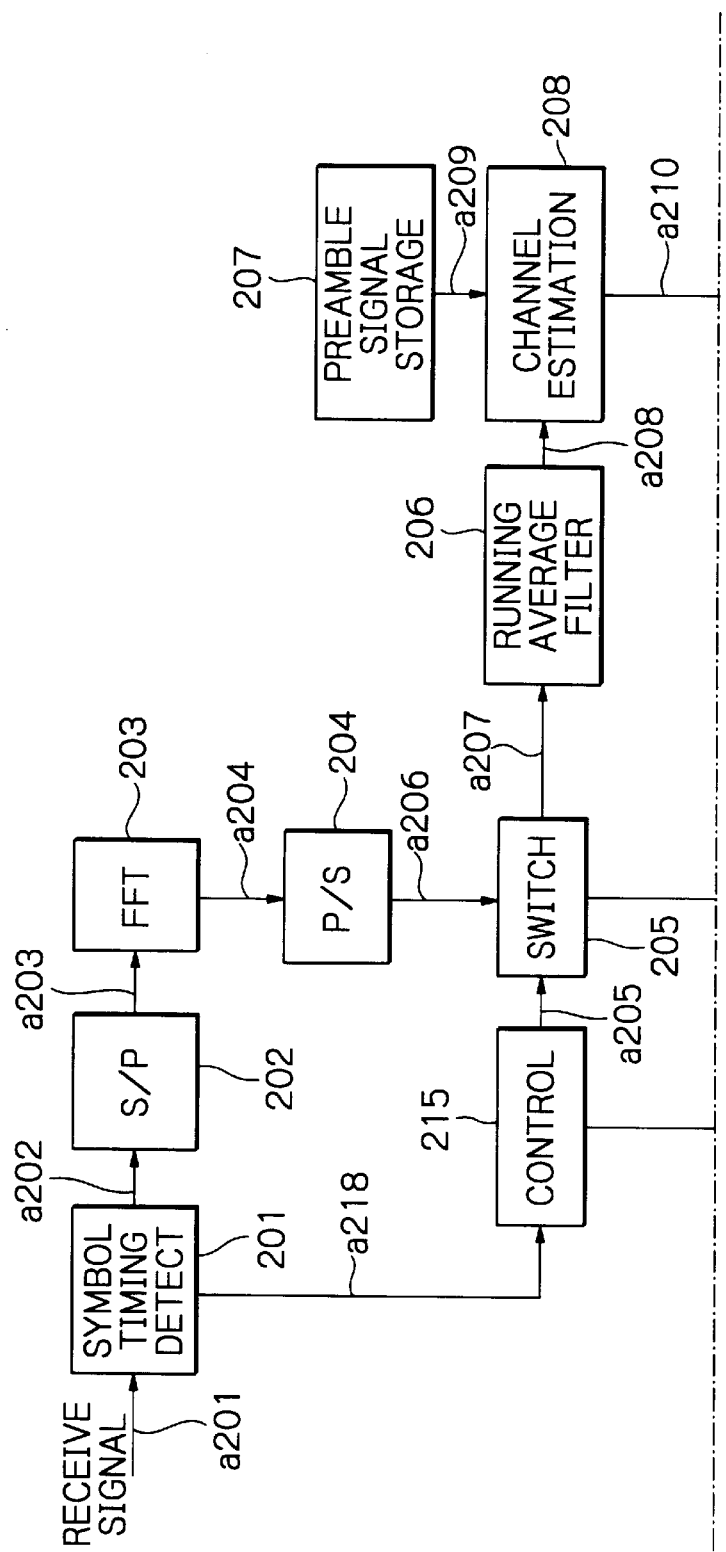

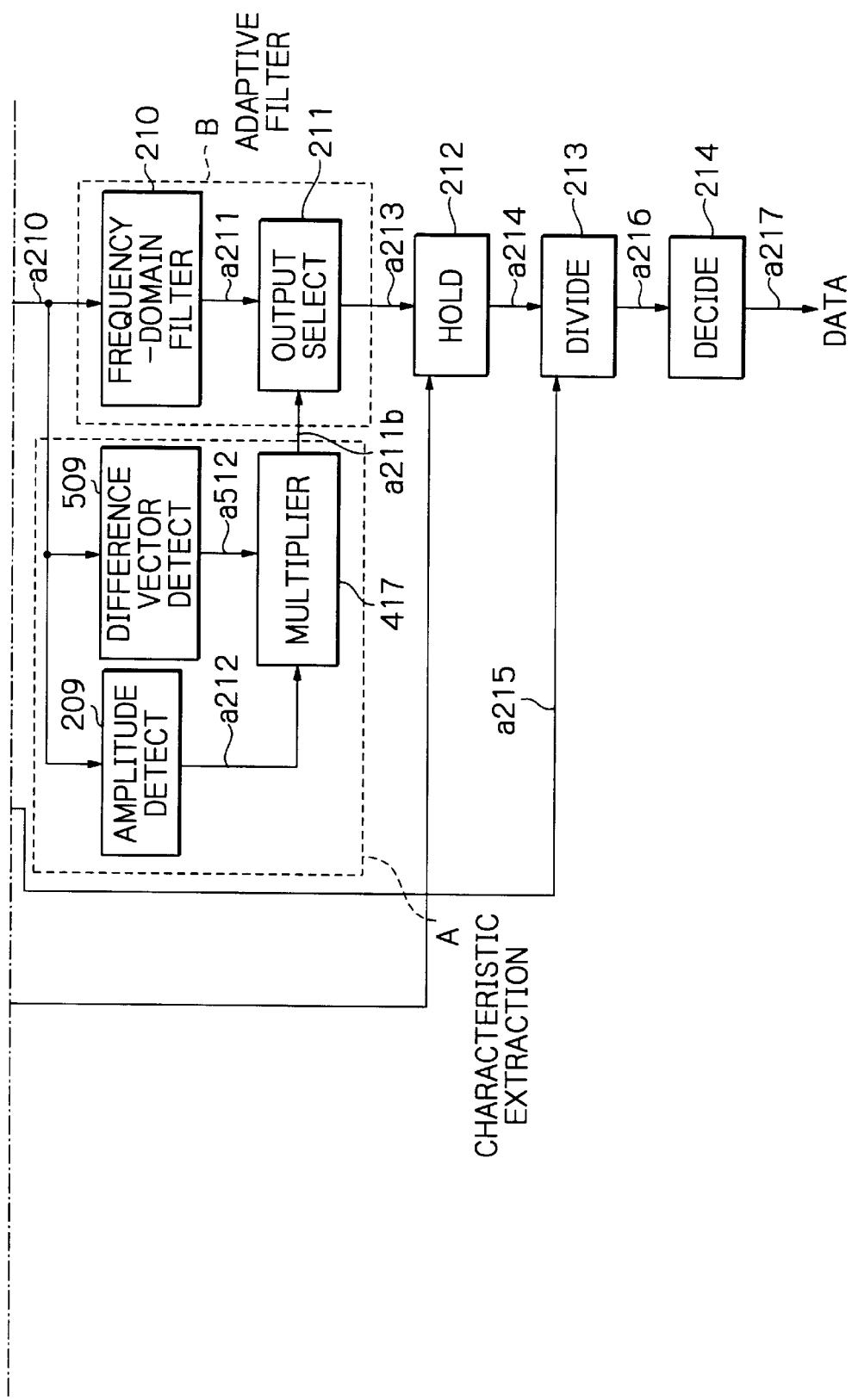

| Fig.13A |
| Fig.13B |

COHERENT DETECTION SYSTEM FOR MULTICARRIER MODULATION

BACKGROUND OF THE INVENTION

The present invention relates to a coherent demodulation system for multichannel modulation system used in digital radio communication system which uses multicarrier modulation system, for instance, OFDM (Orthogonal Frequency Division Multiplexing) as modulation/demodulation system. In particular, the present invention relates to such a system which can be used in an environment in which transfer function or attenuation depends upon each subcarrier in multipath transmission circuit.

In multicarrier modulation system, such as OFDM modulation/demodulation system, a plurality of subcarriers having orthogonal relations to each other are used for transmission of communication. In a transmit side, an information signal is modulated through DQPSK (Differential Quadrature Phase Shift Keying) or 16 QAM (Quadrature Amplitude Modulation) for each subcarriers. The modulated output is applied to IFFT (Inverse Fast Fourier Transform) for inverse transformation so that block demodulation of OFDM signal is obtained.

When a DQPSK system is used for modulation of subcarriers, a delay detection system may be used for demodulation in a receive side. However, a delay detection has disadvantage that the requested Eb/No ratio must be higher by 3 dB as compared with a coherent detection system. Therefore, a coherent detection system is preferable for providing a high quality transmission circuit.

When a coherent detection system is used in a demodulation circuit in a receive side, a transmit side may use a multi-level QAM system as a modulation system. The use of a multi-level QAM system increases transmission rate of information.

When multi-paths are generated in a radio transmission channel between a transmit side and a receive side, transfer function or attenuation for propagation in the circuit depends upon each subcarriers. Therefore, if a coherent detection system is used, a channel transfer function or attenuation must be estimated for estimating amplitude information and phase information of each subcarriers which are subject to vary in each multipath circuit. Further, in a radio LAN (Local Area Network) which transfers information by using a packet, a channel transfer function or attenuation must be estimated for each packet.

A packet has in general a preamble signal at the head of each packet for synchronization purpose. Therefore, a coherent detection circuit may initially carry out channel estimation by using the preamble signal. However, if it takes long time for initial channel estimation, a throughput in a circuit would decrease, and therefore, a high speed initial channel estimation is desired. Thus, an accurate channel estimation by using short preamble signal is essential.

In a radio LAN environment, it is possible to handle that a transmission channel is quasi-static in which a transmission channel does not change during a period of each packet. In such an environment, a coherent detection is possible only by initial channel estimation.

On the other hand, when there is large variation in an environment, a coherent detection system must carry out to estimate channel transfer function or attenuation continuously.

FIG. 16 shows a block diagram of a prior OFDM coherent detection system, in which a coherent detection is carried out for each packet by using a preamble signal. This is shown in S. K. Wilson, E. K. Lhayata and J. M. Cioffi, "16 QAM Modulation with Orthogonal Frequency Devision Multiplexing in a Rayleigh-Fading Environment", Proc. of VTC'94, pp 1660–1664.

In FIG. 16, a symbol timing detection circuit 1 detects a symbol timing of a receive signal a101. An output a102 of the symbol timing detection circuit 1 is applied to a S/P (serial to parallel) conversion circuit 2.

A timing signal a114 detected by the symbol timing detection circuit 1 is applied to a control circuit 11, which generates a signal a105 for switching a preamble part and a data part of a receive signal, and for deciding the duration for holding a channel estimation signal depending upon a period of each receive packet. The signal a105 is applied to a hold circuit 8.

A Fourier transform circuit (FFT) 3 carries out Fourier transformation of an OFDM demodulation signal a103. That is, a parallel input signal a103 in time-domain is converted into a parallel signal a104 in frequency-domain. An output a104 of the Fourier transform circuit 3 is a receive vector signal of each subcarriers.

The signal a104 is applied to a P/S (parallel to serial) conversion circuit 4 which converts a parallel input signal to a serial output signal a106. The switching circuit 5 switches the serial signal a106 into a preamble signal a107 and a data signal a111 based upon the control signal a105 supplied by the control circuit 11.

The preamble signal a107 is applied to a channel estimation circuit 7, which further receives a reference preamble signal a108 from a preamble signal storage circuit 6 which stores a reference preamble signal. The channel estimation circuit 7 carries out the channel estimation for a preamble signal of a receive vector a107 of each subcarriers by using a reference preamble signal a108 according to the following equation (1).

$$r_{receive}/r_{store} \qquad (1)$$

where;

$r_{receive}$ is a received preamble signal a107 (complex number)

$r_{store}$ is a reference preamble signal a108 (complex number)

The signal a109 which shows the result of the channel estimation is applied to the hold circuit 8 which holds the signal a109 for a packet period according to the control signal a105.

On the other hand, the data signal a111 is applied to a divider circuit 9 which further receives an output a110 of the hold circuit 8. The divider circuit 9 carries out the division (a111/a110) so that coherent detection is obtained. The signal a112 obtained by the coherent detection is applied to a decision circuit 10 which decides a data (0 or 1) and outputs the decided output signal a113.

As described above, a coherent detection circuit in FIG. 16 carries out the complex division of a received preamble signal by a reference preamble signal stored in the storage circuit 6 for the channel estimation.

FIG. 17 shows another prior coherent detection circuit which has a carrier filter. This is described in P. Hoeher, "TCM on Frequency-Selective Land-Mobile Fading Channels", Proc. of 5th Tirrenia International Workshop Digital Communication, Tirrenia, Italy, September 1991.

The most portions of FIG. 17 are the same as those of FIG. 16, except that FIG. 17 has a carrier filter 1011 at the output of the channel estimation circuit 107.

In FIG. 17, a symbol timing detection circuit 101 detects a symbol timing in a receive signal a1101. An output a1102 of the symbol timing detection circuit 101 is applied to a S/P conversion circuit 102.

A timing signal a1115 provided by the symbol timing detection circuit 101 is applied to a control circuit 1012, which generates a control signal a1105 according to a timing signal a1115. The control signal a1105 functions to switch a preamble part and a data part of a receive signal, and to hold a signal according to duration of a receive packet.

A parallel signal a1103 of an output of the S/P conversion circuit 102 is applied to a Fourier Transform circuit 103 which provides a receive vector signal a1104 for each subcarriers.

A P/S conversion circuit 104 converts a receive vector signal a1104 for each subcarriers into a serial signal a1106. A switching circuit 105 switches the receive vector in serial form a1106 into a preamble signal a1107 and a data signal a1111 according to the control signal a1105.

The preamble signal a1107 is applied to a channel estimation circuit 107, which further receives a reference preamble signal from a preamble storage circuit 106. The channel estimation circuit 107 carries out the channel estimation for a receive vector a1107 of each subcarriers by using a reference preamble signal a1108 from a preamble signal storage circuit 106 according to the equation (1). The signal a1109 obtained by the channel estimation is applied to a carrier filter 1011.

An output signal a1114 of the carrier filter 1011 is applied to a hold circuit 108, which further receives a control signal a1105, and holds an input signal a1114 for duration of data period of a receive packet.

A data signal a1111 is applied to a divider 109, which further receives an output a1110 of the hold circuit 108, and carries out the coherent detection. The signal a1112 obtained by the coherent detection is applied to a decision circuit 1010 for decision of data (0 or 1). Thus, the decided data a1113 is obtained.

The coherent circuit in FIG. 17 has the advantage that the accurate channel estimation is obtained because of the use of a carrier filter for the estimated channel transfer function or attenuation.

A coherent detection system provides high quality of radio communication system as compared with a delay detection system. Further, the use of a coherent detection system allows the use of multi-level QAM modulation signal, thus, higher rate communication system is obtained.

However, a prior art in FIGS. 16 and 17 which carry out the channel estimation using stored preamble signal has the disadvantage that the channel estimation would be degraded and no accurate coherent detection would be obtained in high thermal noise environment.

Further, the use of a carrier filter in FIG. 17 has the disadvantage that the size of a whole circuit of a coherent detection system is large, and the cost of the system is high.

SUMMARY OF THE INVENTION

It is an object, therefore, of the present invention to overcome the disadvantages and limitations of a prior coherent detection system by providing a new and improved coherent detection system for multicarrier modulation.

It is also an object of the present invention to provide a coherent detection system for multicarrier modulation, which can provide accurate channel estimation error under severe environment such as high thermal noise and/or deep multi-path fading.

It is also an object of the present invention to provide such a coherent detection system which is simple in structure and small in circuit size.

The basic idea of the present invention resides in that a channel estimation for a preamble signal is first carried out as is the case of a prior art. The channel estimation thus obtained is a provisional channel estimation in the present invention. The accuracy of the channel estimation is improved by processing each subcarriers in the provisional channel estimation by using an adaptive filter. The tap coefficients of the adaptive filter are controlled according to a characteristic value of each subcarrier in the provisional channel estimation.

The above and other objects are attained by a coherent detection system for multicarrier modulation system comprising; a Fourier transform circuit for receiving multicarrier modulation signal modulated with a plurality of subcarriers, and providing multicarrier demodulation so that receive vector signal of each subcarriers is obtained; a provisional channel estimation means which divides said receive vector signal of each subcarriers of an output of said Fourier transform circuit, by a reference transmit vector signal or a transmit vector obtained by demodulation of a receive signal, so that transfer function or attenuation of each subcarriers on propagation is estimated; a filter means for smoothing estimated channel transfer function from said channel estimation means among subcarriers; a divider means for dividing said receive vector signal by estimated channel transfer function or attenuation from said filter means so that said receive vector signal is coherent detected; wherein said filter means is an adaptive filter constituted by a transversal filter in which at least one of a number of taps and tap coefficient of each taps is adaptively controllable; a characteristic extraction circuit receiving estimated channel attenuation of each subcarriers obtained by said channel estimation means is provided; a selection circuit for selecting at least one of a number of taps and tap coefficient of each taps of said adaptive filter according to an output of said characteristic extraction circuit is provided; and said selection circuit selects one of outputs of said adaptive filter for each subcarriers according to an output of said characteristic extraction circuit so that estimated channel attenuation for each subcarriers is provided.

The channel estimation by said channel estimation means is a provisional channel estimation, which is subject to improve by using an adaptive filter. Said divider means provides coherent detection by dividing a receive vector by an improved channel estimation of each subcarrier.

It should be noted that a receive signal which is received through a multipath transmission channel having deep fading is subject to amplitude variation for each receive vector of a subcarrier. Further, thermal noise is superimposed to a receive signal. The present invention removes the affection of noise and fading by using an adaptive filter.

However, if a filter having fixed tap coefficients is used for all the estimated subcarriers, no accurate estimation is possible when amplitude variation due to fading is large. Therefore, the present invention controls tap coefficients of an adaptive filter according to a characteristic value of a subcarrier in order to suppress the degradation of channel estimation by fading.

The present invention uses a plurality of filters each having different tap coefficient from one another for smoothing estimated channel attenuation between subcarriers, therefore, excellent channel estimation is obtained by selecting one of the filter outputs adaptively. In an embodiment, a selection means selects an output of an adaptive filter according to an output signal of a characteristic extraction means for each subcarriers, and therefore, difference of amplitude and/or phase rotation among subcarriers provides less affection o channel estimation.

A plurality of tap coefficients of an adaptive filter are implemented merely by bit shift operation in any embodiment. Assuming that tap coefficient of a center tap is 1, and a tap coefficient of another tap is a power of (1/2), a product multiplied by a tap coefficient is obtained merely by bit shift of a signal according to a tap position. Therefore, a plurality of filter means are obtained with no additional multiplier, and size of a circuit may be small.

A characteristic value of said characteristic extraction means is, for instance, estimated amplitude of a subcarrier, estimated phase rotation between adjacent subcarriers, product of estimated amplitude and estimated phase rotation between adjacent subcarriers, vector difference between adjacent subcarriers, and product of estimated amplitude and vector difference.

The larger a characteristic value is, the larger the tap coefficient of an adaptive filter is.

Preferably, a symbol timing detection means is provided for receiving multicarrier modulation signal modulated on a plurality of subcarriers, and detecting a symbol timing in the received signal. Said Fourier Transform is carried out for the signal with a symbol timing detected.

Preferably, a phase compensation means is provided between said channel estimation means and said adaptive filter means, so that constant phase rotation between adjacent subcarriers is preliminary compensated, and compensated channel attenuation is applied to the adaptive filter.

Preferably, a phase-compensated extrapolation means and a phase compensation are provided between said channel estimation means and said adaptive filter means, so that said extrapolation means receives said estimated channel attenuation of subcarriers at extreme ends in pass band, effects phase compensation to a received signal according to constant phase error between subcarriers due to an error of an OFDM symbol detection window in said symbol timing detection means, and extrapolates phase compensated signal, when signals out of the pass band is requested in said adaptive filter for processing a subcarrier close to end of the pass band, and said phase compensation means receives estimated channel attenuation within the pass band and extrapolated signals out of the pass band provided by said phase-compensated extrapolation means, effects compensation of constant phase rotation in received signals, and applies phase compensated signals to said adaptive filter means.

Preferably, a characteristic value compensation means (1217) is provided between said channel estimation means (208) and said characteristic extraction means (A), so that said characteristic value compensation means (1217) receives an output of said channel estimation means (208) including constant phase error due to OFDM symbol detection window error in said symbol timing detection means, compensating said constant phase error and applying phase compensated signal to said characteristic extraction means (A).

Preferably, an extrapolation means is provided between said channel estimation means and said adaptive filter, so that said extrapolation means receives said estimated channel attenuation of subcarriers, and extrapolates said estimated channel attenuation of subcarriers at extreme ends in pass band, when signals out of the pass band is requested in said adaptive filter for processing a subcarrier close to end of the pass band.

Preferably, said adaptive filter means is controlled by a measured signal of modulation system of each subcarrier.

Preferably, said adaptive filter means is a transversal filter which controls bandwidth of the filter by a number of taps and tap coefficient of each taps of the filter.

BRIEF DESCRIPTION OF THE DRAWINGS

The foregoing and other objects, features, and attendant advantages of the invention will be appreciated as the same become better understood by means of the following description and drawings wherein;

FIG. 12 is a block diagram of still another embodiment of an OFDM coherent detection system according to the present invention.

DESCRIPTION OF THE PREFERRED EMBODIMENTS

First Embodiment

Figure 5:
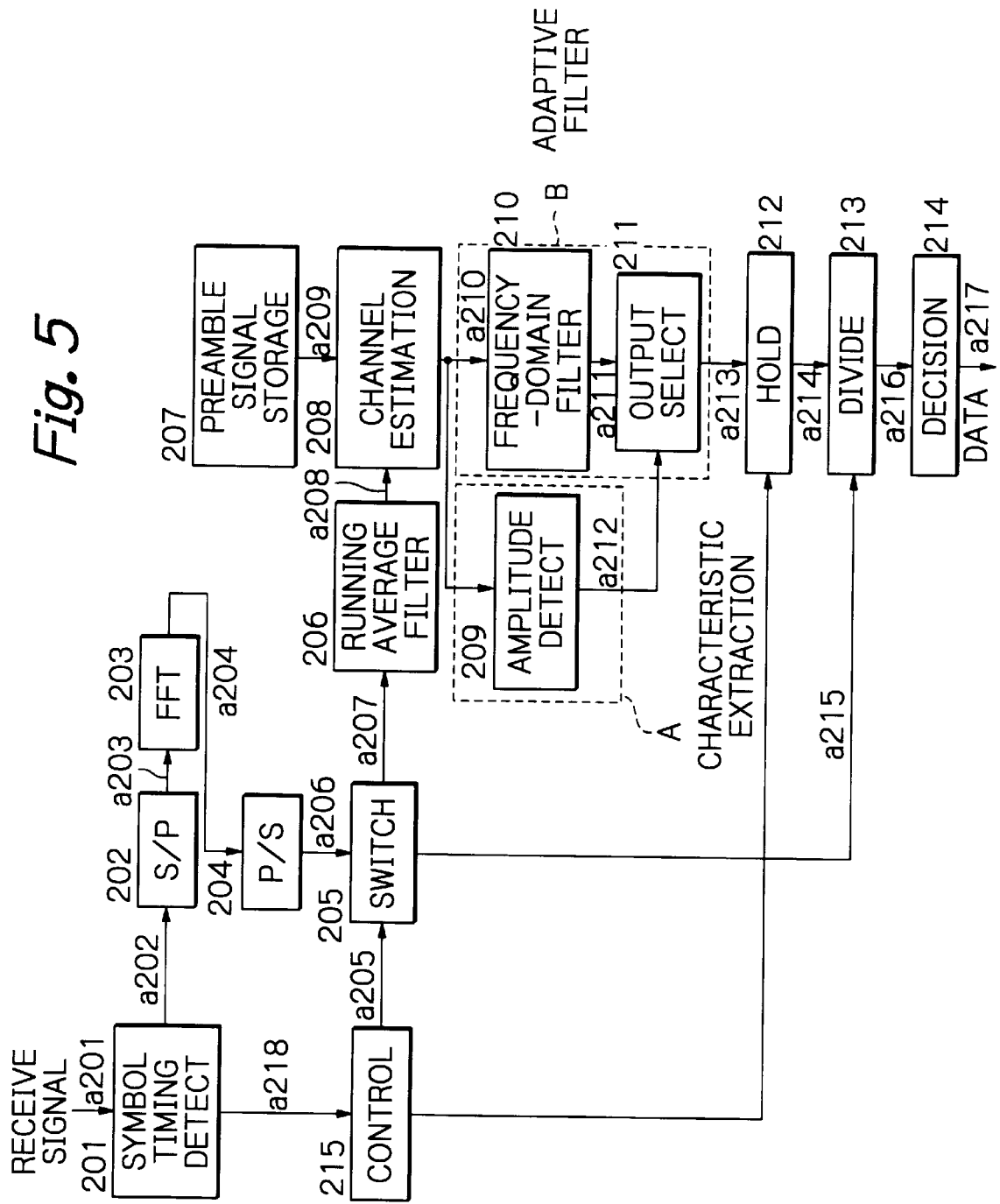
FIG. 5 is a block diagram of an OFDM coherent detection system according to the present invention.

FIG. 5 shows a block diagram of an OFDM coherent detection system according to the present invention.

Figure 6:
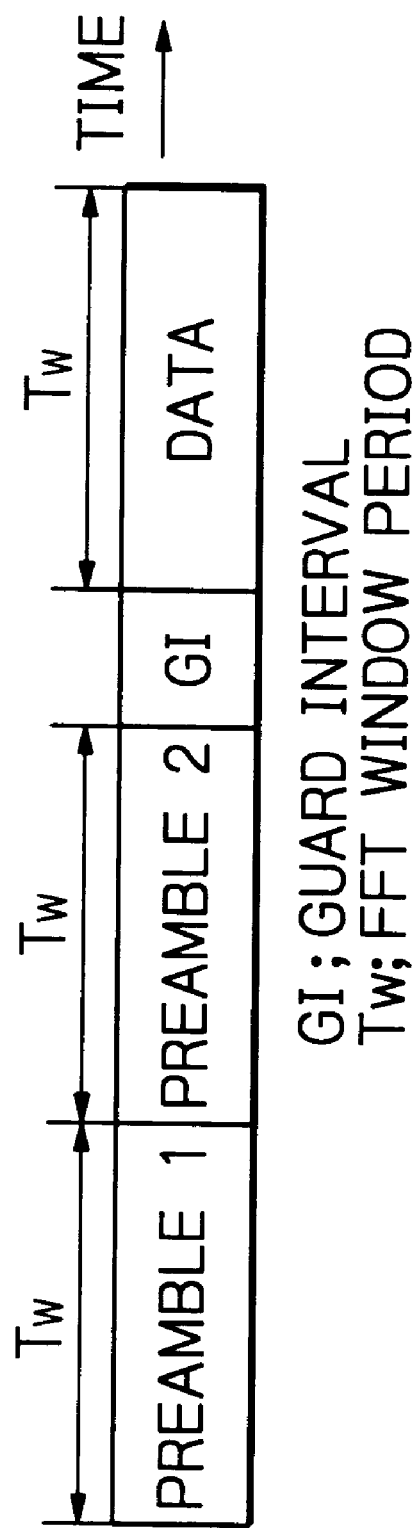
FIG. 6 shows a format of a packet signal.

It is assumed that an OFDM coherent detection system in FIG. 5 is mounted in a reception system of a communication system which handles a signal format as shown in FIG. 6. In FIG. 6, a pair of preamble signals for synchronization purpose are provided at the head of a data in each packet. In FIG. 6, GI shows guard interval, and Tw is FFT window period.

A receive signal a201 having the signal format as shown in FIG. 6 is applied to an input of an OFDM coherent detection system in FIG. 5.

A coherent detection system in FIG. 5 comprises a symbol timing detection circuit 201, an S/P (serial to parallel) conversion circuit 202, an FFT (Fast Fourier Transform) circuit 203, a P/S (parallel to serial) conversion circuit 204, a switching circuit 205, a running average filter 206 of two symbols, a preamble signal storage circuit 207, a channel estimation circuit 208, an amplitude detection circuit 209, a frequency-domain filter 210, an output selection circuit 211, a hold circuit 212, a division circuit 213, a decision circuit 214, and a control circuit 215. In the embodiment of FIG. 5, a characteristic extraction circuit A of each subcarrier is comprised of an amplitude detection circuit 209, and an adaptive filter B is comprised of a frequency-domain filter 210 and an output selection circuit 211.

The symbol timing detection circuit 201 detects symbol timing in a receive signal a201. A receive signal a202 which passes the symbol timing detection circuit 201 is applied to the S/P conversion circuit 202 which converts a signal from serial form into parallel form a203.

The signal a203 in parallel form is applied to the FFT circuit 203, which carries out OFDM demodulation, in other words, a parallel signal in time domain is transformed into a parallel signal in frequency domain. An output signal a204 of the FFT circuit 203 is a complex signal indicating a receive vector of each subcarrier. A parallel output signal a204 of the FFT circuit 203 is applied to the P/S conversion circuit 204 which converts the signal from parallel form into serial form a206. The serial signal a206 is applied to a switching circuit 205.

The signal a218 indicating a symbol timing detected by the symbol timing detection circuit 201 is applied to the control circuit 215, which generates a control signal a205 according to an input signal a218. The control signal a205 is used for switching a signal in the switching circuit 205, and for holding a signal in the hold circuit 212 according to the packet period of a receive packet.

The switching circuit 205 switches an input signal a206 based upon whether a signal is a preamble part a207 or a data part a215. The preamble part a207 is applied to the two symbols running average filter 206, which provides average of two OFDM symbols in time-domain.

The channel estimation circuit 208 receives an average signal a208 of the running average filter 206, and a reference signal a209 of the preamble signal storage circuit 207. The preamble signal storage circuit 207 provides a reference preamble signal a209 which is stored in the storage circuit 207.

The channel estimation circuit 208 carries out the channel estimation according to two input signals a208 and a209, that is to say, the signal a208 which includes a receive vector of each of a plurality of subcarriers in the receive OFDM signal is divided by a reference signal a209 which is a known a transmit vector of said receive vector. Thus, a transfer function or attenuation in radio propagation path is estimated for each channels (frequencies) of the subcarriers.

The channel estimation circuit 208 provides an output signal a210 which has the estimated result. That output signal a210 is applied to the amplitude detection circuit 209 in the characteristic extraction circuit A, and the frequency-domain filter 210 in the adaptive filter B. The amplitude detection circuit 209 provides an output signal a212 according to amplitude of each subcarries of the input signal a210.

Figure 2:
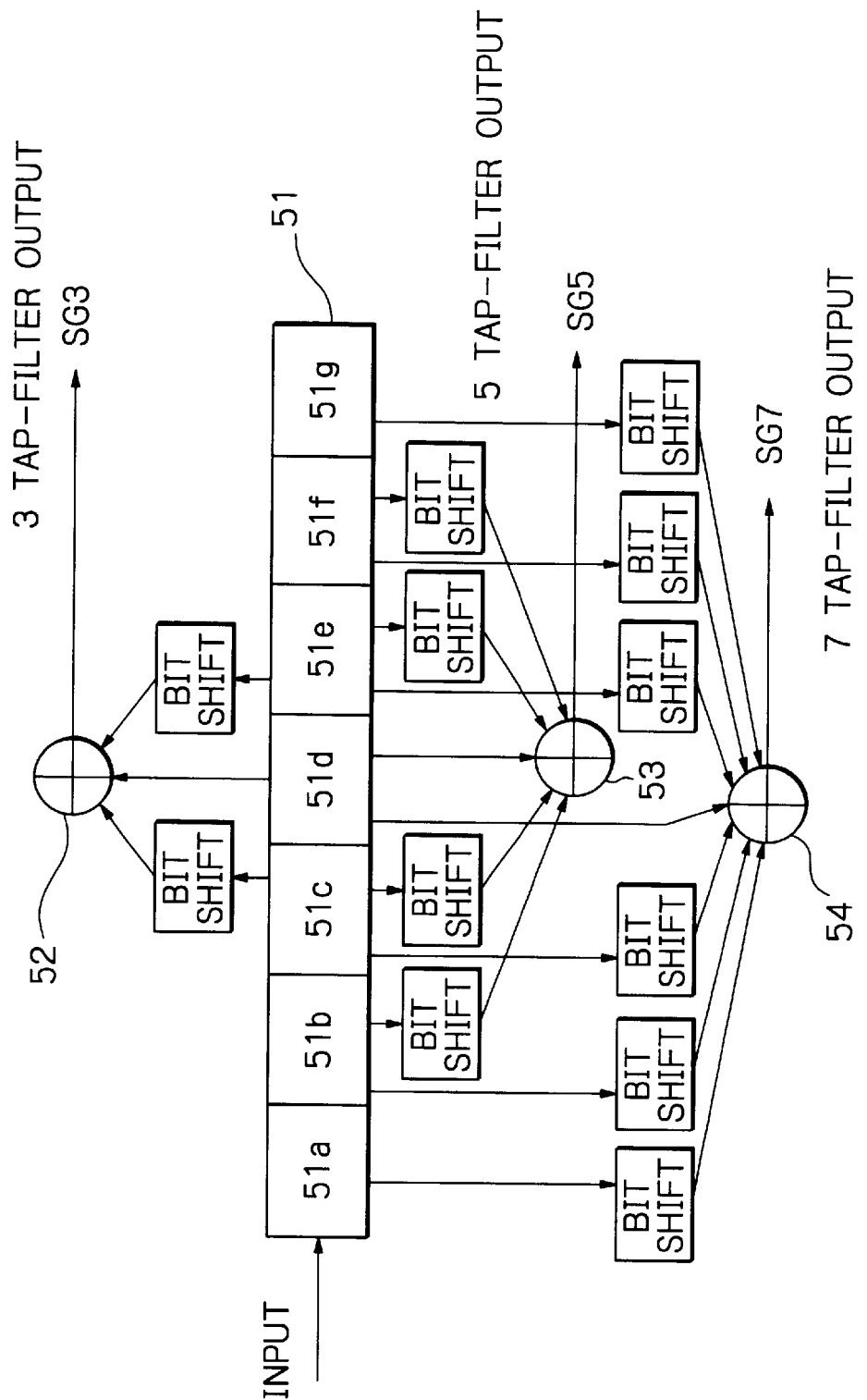
FIG. 2 is a block diagram of a transversal filter used in the present invention.

The frequency-domain filter 210 is a transversal filter as shown in FIG. 2, in which a plurality of delay elements 51 (51a through 51g) which provides seven tap outputs each having different timing, and three adders 52, 53 and 54 are provided. A bit shift circuit between a delay element and an adder shifts a word of a tap output by one bit or a plurality of bits so that the most significant bit and/or some of the adjacent bits is replaced by zero.

The frequency-domain filter 210 in FIG. 2 constitutes essentially three transversal filters having different tap coefficients, and providing outputs SG1, SG2 and SG3. It is assumed that the tap coefficient of the center delay element 51d is 1, and the tap coefficient of another delay element is determined to be a power of (1/2) of the tap coefficient of the adjacent delay element.

An adder 52 provides a filter output SG3 which is the sum of third tap output 51c, fourth tap output 51d and fifth tap output 51e. It should be noted that each tap outputs applied to the adder 52 are shifted by one bit with each other. The multiplication of tap coefficients is carried out by the bit shift, and therefore, no specific multiplier is necessary for the multiplication of tap coefficients.

Similarly, an adder 53 provides a filter output SG5 which is sum of five tap outputs 51b, 51c, 51d, 51e and 51f. An adder 54 provides a filter output SG7 which is the sum of seven tap outputs 51a 51b, 51c, 51d, 51e, 51f, and 51g.

A frequency-domain filter 210 in FIG. 2 has the advantage that the structure is simple as it has no multiplier.

The signal a210 applied to the frequency-domain filter 210 is complex signal. The filter 210 carries out the filter operation for real part and imaginary part of complex signal, and then, carries out the vector combination.

The output selection circuit 211 selects one of the output signals a211 (one of SG1, SG2 and SG3) of the frequency-domain filter 210, according to the amplitude a212 of each subcarrier. Said amplitude 212 is detected by the amplitude detection circuit 209. The selected signal a213 is applied to the hold circuit 212.

The hold circuit 212 holds the signal a213 for the packet receive period according to the control signal a215 of the control circuit 215. The signal a214 is an output signal of the hold circuit 212.

The division circuit 213 divides a data signal a215 included in a receive signal by the signal a214 from the hold circuit 212. Thus, a coherent detection is carried out. The signal a216 which is the coherent detection signal is applied to the decision circuit 214 which decides a symbol (1 or 0), and the decided result is output as a data a217.

Figure 1:
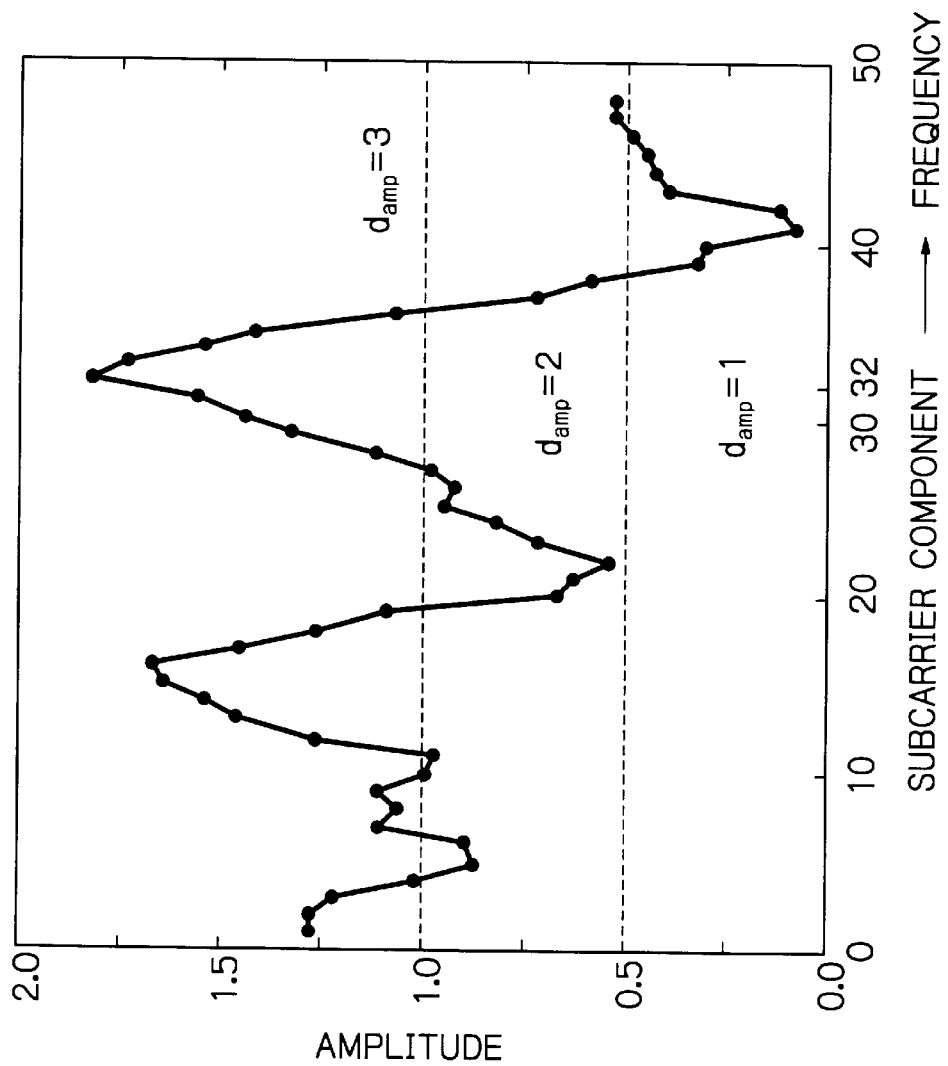
FIG. 1 is shows a curve of amplitude of subcarriers in an estimated signal.

A receive signal (estimated signal) which is amplitude-deformed by multi-path fading is for instance as shown in FIG. 1, in which horizontal axis shows frequency or subcarriers, and vertical axis shows signal amplitude of each subcarriers. In FIG. 1, it is assumed that the average power of a receive signal is 1. A receive signal which is received through transmission path which is subject to fading is subject to amplitude variation for a receive vector of each subcarriers, as shown in FIG. 1. Further, thermal noise is superposed on a receive signal in a receiver.

An OFDM coherent detection system in FIG. 5 has a frequency-domain filter 210 for removing affection of noise such as thermal noise. It should be noted that if all the subcarriers are processed by using a filter having the common tap coefficients for all the subcarriers, accurate estimation of transfer function of each channel is impossible when amplitude variation of each subcarriers is large as shown in FIG. 1.

In order to solve that problem, according to the present coherent detection system, the output selection circuit 211 selects on of the oututs (SG1, SG2 or SG3) of the filter 210, according to the amplitude of each subcarrier detected by the amplitude detection circuit 209. Thus, a tap coefficient of the frequency-domain filter is essentially controlled adaptively according to the amplitude of each subcarrier.

In FIG. 5, the amplitude detection circuit 209 provides an output signal a212 which carries a quantized output $d_{amp}$ according to the amplitude (A) of the subcarriers a210, as shown in the equation (2).

$$d_{amp}=3(1.0<=(A)$$

$$d_{amp}=2(0.5<=(A)<1.0$$

$$d_{amp}=1(0<=(A)<0.5 \qquad (2)$$

When the frequency-domain filter 210 provides three outputs SG1, SG2 and SG3 as shown in FIG. 2, the quantized outputs $d_{amp}$ correspond to outputs of the filter 210.

Thus, the output selection circuit 211 selects the output SG7 when the amplitude of a subcarrier is equal to or higher than 1.0, the output SG5 when the amplitude of a subcarrier is less than 1.0 and equal to or higher than 0.5, or SG3 when the amplitude of a subcarrier is less than 0.5, according to the output a212 of the amplitude detection circuit 209.

Of course, the structure of a frequency-domain filter 210, the operation of quantization in an amplitude detection circuit 209, and selection condition in an output selection circuit 211 may be modified within the spirit of the invention.

Thus, the bandwidth of an adaptive filter B is narrow when the characteristic value or an amplitude of a subcarrier is large, and is wide when the characteristic value or an amplitude of a subcarrier is small.

Thus, a filter coefficient of a frequency-domain filter 210 is adaptively modified for each subcarriers according to the amplitude of the subcarrier signal a210. Therefore, even when amplitude variation among subcarriers is large as shown in FIG. 1, the accurate estimation of transfer function or attenuation of each channel is possible.

Second Embodiment

Figure 7:
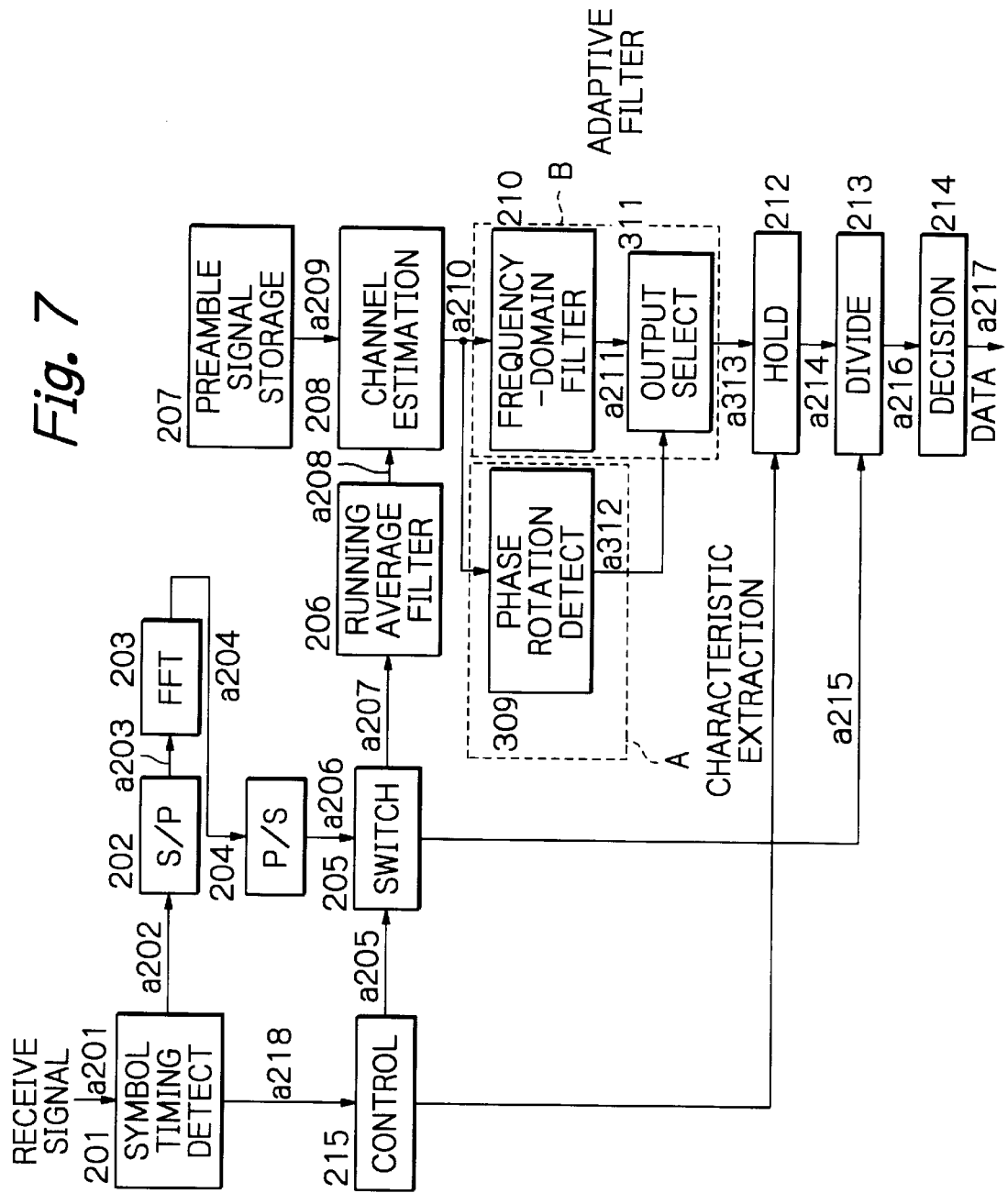
FIG. 7 is a block diagram of another embodiment of an OFDM coherent detection system according to the present invention.

FIG. 7 shows a block diagram of another embodiment of an OFDM coherent detection system according to the present invention. The same numerals in FIG. 7 as those in FIG. 5 show the same members. It is assumed that the coherent detectin system in FIG. 7 processes a signal having the format as shown in FIG. 6.

The same numerals in FIG. 7 as those in FIG. 5 show the same members as those in FIG. 5.

An OFDM coherent detection system in FIG. 7 comprises a symbol timing detection circuit 201, an S/P (serial to parallel) conversion circuit 202, a FFT (Fast Fourier Transform) circuit 203, a P/S (parallel to serial) conversion circuit 204, a switching circuit 205, a running average circuit 206 for a pair of symbols, a preamble symbol storage circuit 207, a channel estimation circuit 208, a phase rotation detection circuit 309, a frequency-domain filter 210, an output selection circuit 311, a hold circuit 212, a division circuit 213, a decision circuit 214 and a control circuit 215. The phase rotation detection circuit 309 constitutes a characteristic extraction circuit A of each subcarrier. The frequency-domain filter 210 and the output selection circuit 311 constitute an adaptive filter B.

In FIG. 7, the channel estimation circuit 208 carries out channel estimation based upon two input signals a208 and a209. That is to say, the signal a208 which is a preamble signal in a receive vector of each of a plurality of subcarriers included in a receive OFDM signal is divided by a signal a209 which is reference transmit vector. Thus, a transfer function or an attenuation on propagation path is estimated for each subcarriers.

A signal a210 which indicates the result of the channel estimation in the channel estimation circuit 208 is applied to the phase rotation detection circuit 309 and the frequency-domain filter 210. In the signal a210 applied to the phase rotation detection circuit 309, a plurality of signal components of a plurality of subcarriers are positioned sequentially.

The phase rotation detection circuit 309 provides a quantized phase rotation a312 between a signal component of a previous subcarrier and a signal component of a current subcarrier. The output selection circuit 311 selects one of the outputs SG3, SG5 and SG7 of the frequency-domain filter 210 according to the output signal a312 of the phase rotation detection circuit 309, and provides selected signal a313.

Figure 3:
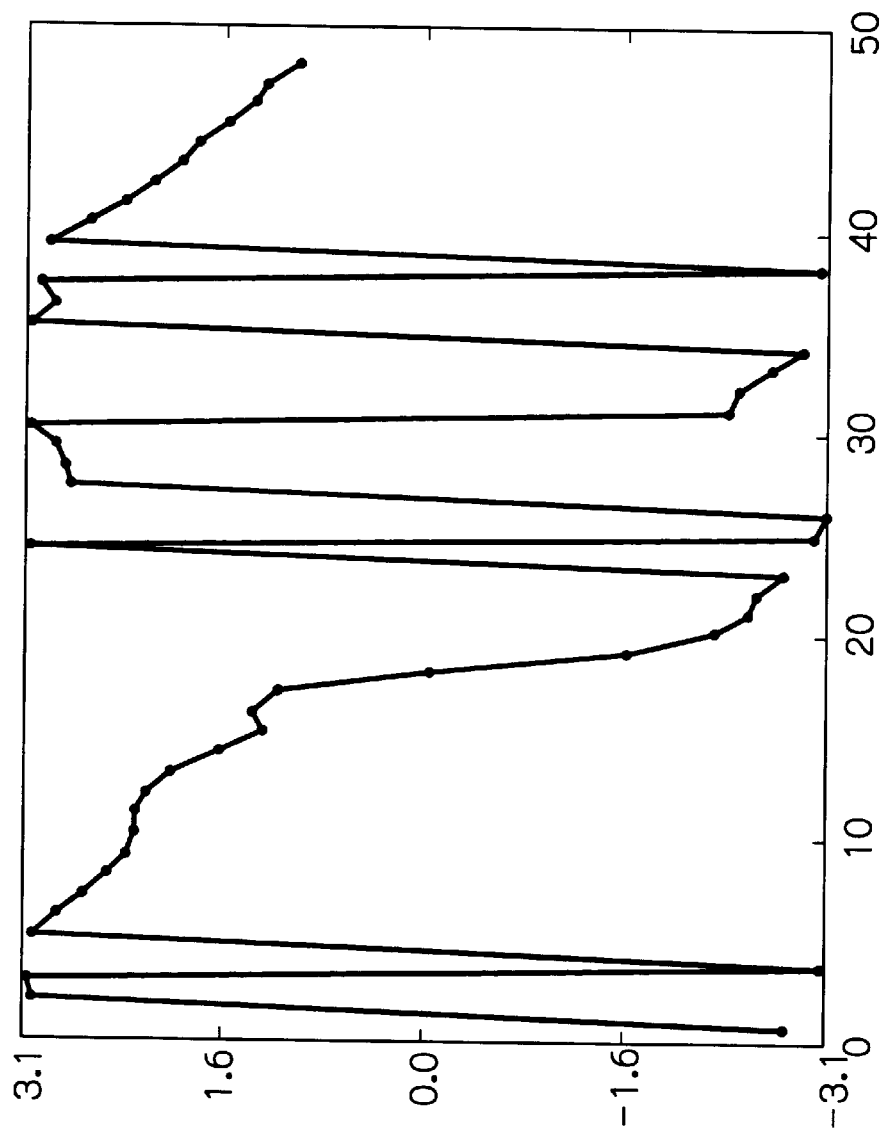
FIG. 3 shows a curve of phase rotation in a channel estimated signal.

A receive signal (estimated-signal) which is subject to multi-path fading has for instance phase distribution as shown in FIG. 3, in which horizontal axis shows a subcarrier number, and vertical axis shows phase of a signal. It should be noted in FIG. 3 that phase of a signal which is transmitted through a propagation path having fading depends upon a receive vector of each subcarrier. Further, phase is affected by thermal noise in a receiver.

The OFDM coherent detection circuit in FIG. 7 has a frequency-domain filter 210 for removing affection by thermal noise. If the frequency-domain filter had the common tap coefficient for all the subcarriers, the transfer function or attenuation of each channel would not be estimated correctly, therefore, the output selection circuit 311 selects one of the outputs of the frequency-domain filter 210 according to the phase rotation measured by the phase rotation detection circuit 309. Thus, a tap coefficient of the frequency-domain filter 210 is adaptively controlled according to phase rotation of a signal.

The phase rotation detection circuit 309 in FIG. 7 provides an output signal a312 of the phase rotation θ between two adjacent subcarriers, by quantizing said phase rotation as follows.

$$d_{phase}=3(\theta<pi/16)$$

$$d_{phase}=2(pi/16<=\theta<pi/8)$$

$$d_{phase}=1(pi/8<=\theta) \qquad (3)$$

Figure 4:
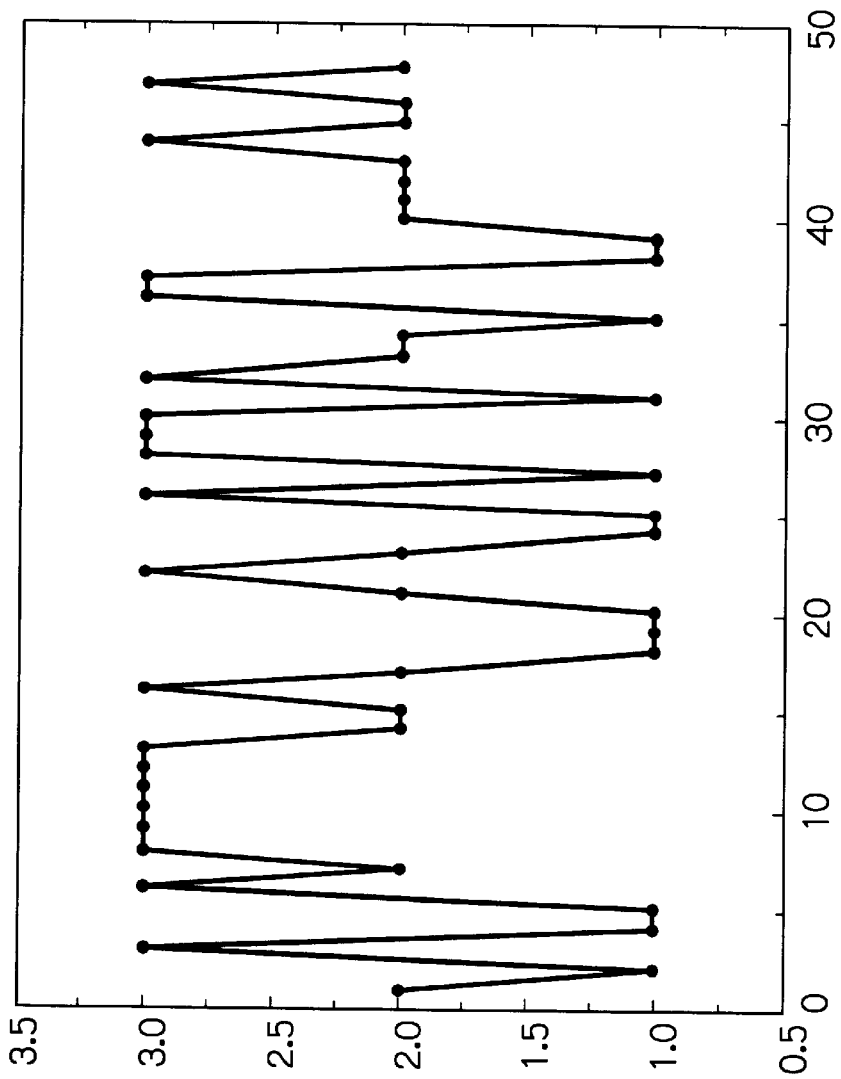
FIG. 4 shows a curve of quantized phase rotation in a channel estimated signal.

When the signal in FIG. 3 is quantized according to the equation (3), the result as shown in FIG. 4 is obtained. In FIG. 4, horizontal axis shows a subcarrier number, and vertical axis shows quantized phase rotation $d_{phase}$.

When the frequency-domain filter 210 in FIG. 7 has three outputs SG3, SG5 and SG7 as shown in FIG. 2, the output selection circuit 311 selects one of the outputs SG3, SG5 and SG7 according to values 1, 2 and 3 of the quantized phase rotation $d_{phase}$, respectively.

In other words, the output selection circuit 311 selects a filter output SG7 when (θ<pi/16) is satisfied, a filter output SG5 when (pi/16<=θ<pi/8) is satisfied, or SG3 when (pi/8<=θ) is satisfied, according to an output signal a312. Of course, it should be appreciated that any modification of a frequency-domain filter 210 and a phase rotation detection circuit 311 is possible to those skilled in the art when it is requested. In any modification, a tap coefficient of a frequency-domain filter 210 which has an output selection circuit 311 provide an output signal a313 is adaptively controlled for each subcarriers according to the phase rotation of the singal a210.

Therefore, it should be appreciated that the circuit in FIG. 7 can estimate transfer function or attenuation of each channel, even when variation of phase rotation between each channels is large.

Third Embodiment

Figure 8:
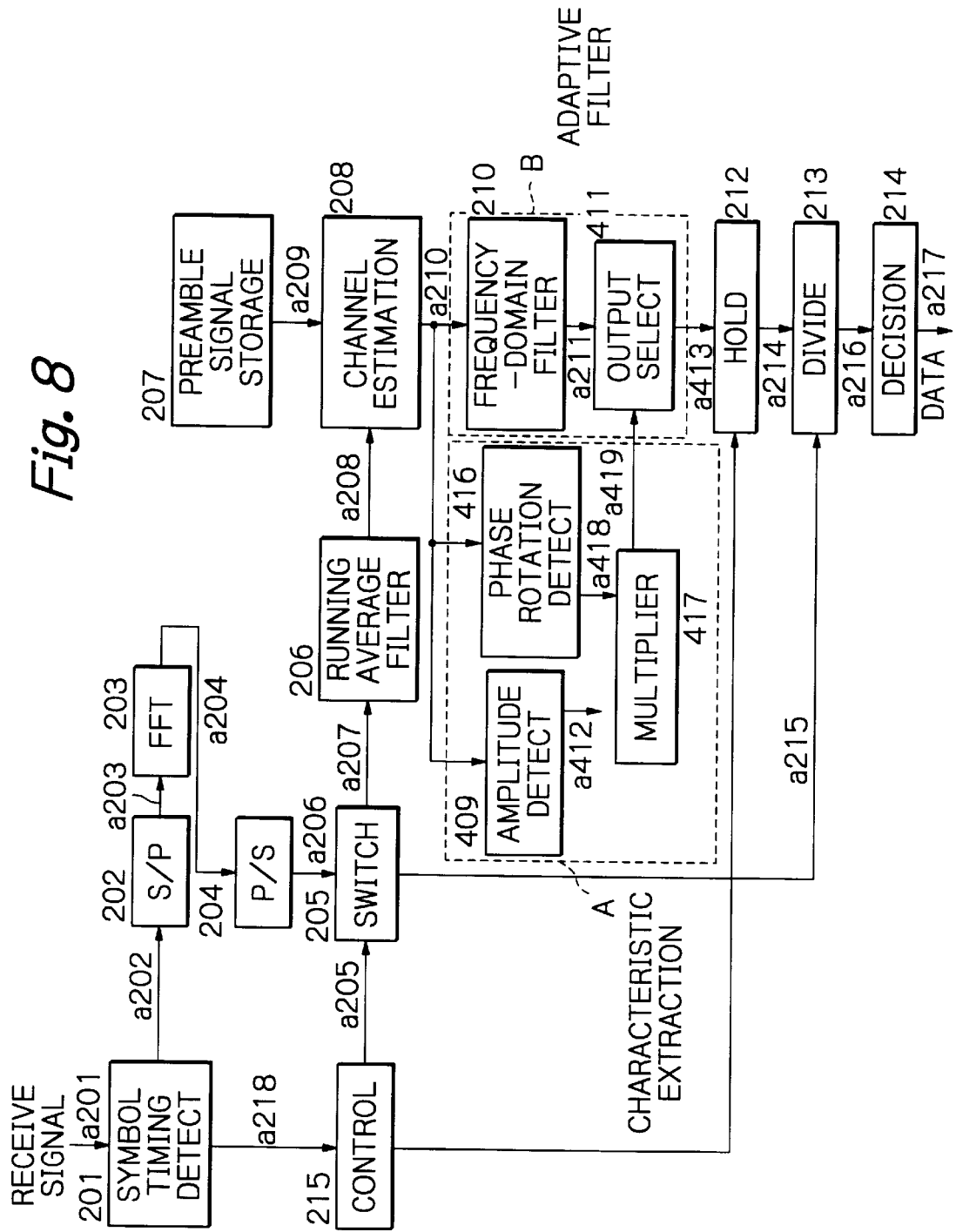
FIG. 8 is a block diagram of still another embodiment of an OFDM coherent detection system according to the present invention.

FIG. 8 shows a block diagram of still another embodiment of the present OFDM coherent detection system. The same numerals as those in FIG. 5 show the same members. It is assumed that the system in FIG. 8 processes a signal shown in FIG. 6.

The OFDM coherent detection system in FIG. 8 comprises a symbol timing detection circuit 201, an S/P (serial to parallel) conversion circuit 202, a FFT (Fast Fourier transform) circuit 203, a P/S (parallel to serial) conversion circuit 204, a switching circuit 205, a running average filter 206 for two symbols, a preamble signal storage circuit 207, a channel estimation circuit 208, an amplitude detection circuit 409, a phase rotation detection circuit 416, a multiplier 417 of two detected values, a frequency-domain filter 210, an output select circuit 411, a hold circuit 212, a division circuit 213, a decision circuit 214 and a control circuit 215.

The amplitude detection circuit 409, the phase rotation detection circuit 416 and the multiplier 417 constitute a characteristic extraction circuit A. The frequency-domain filter 210 and the output selection circuit 411 constitute an adaptive filter B.

In FIG. 8, the channel estimation circuit 208 carries out channel estimate according to two input signals a208 and a209. The signal a208 which is a preamble signal included in a receive vector of a subcarrier in a receive OFDM signal is divided by the signal a209 which is a reference transmit signal. Thus, transfer function in propagation path is estimated for each channel of each subcarriers.

The signal a210 which carries the estimated result in the channel estimation circuit 208 is applied to the amplitude detection circuit 409, the phase rotation detection circuit 416 and the frequency-domain filter 210. The signal a210 has a plurality of signal components of subcarriers sequentially.

The amplitude detection circuit 409 provides an output signal a412 which carries quantized amplitude of each subcarriers in the signal a210, as is the case of the amplitude detection circuit 209 in FIG. 5.

The phase rotation detection circuit 416 provides an output signal a418 which carries quantized phase rotation between a previous subcarrier and a current subcarrier for each subcarriers in an input signal a210. The multiplier circuit 417 provides the product of the signals a412 and a418 so that the charactristic signal a419 of each subcarrier is provided. The signal a419 is a quantized value, such as 1, 2 or 3, which is applied to the output selection circuit 411.

The output selection circuit 411 selects one of the outputs (SG3, SG5 and SG7 in FIG. 2) of the frequency-domain filter 210, according to the output signal a419 of the multiplier circuit 417. The selected signal is output as a413.

The OFDM coherent detection system in FIG. 8 measures both the amplitude of the signal a210, and the phase rotation of the signal a210, as the characteristic value of each subcarrier, so that the characteristic of the frequency-domain filter 210 which processes a receive signal is determined.

Thus, it should be appreciated that the coherent detection system in FIG. 8 can estimate transfer function or attenuation of each channel even when variation of amplitude and phase rotation of each channel is large as shown in FIGS. 1 and 3.

Fouth Embodiment

Figure 9:
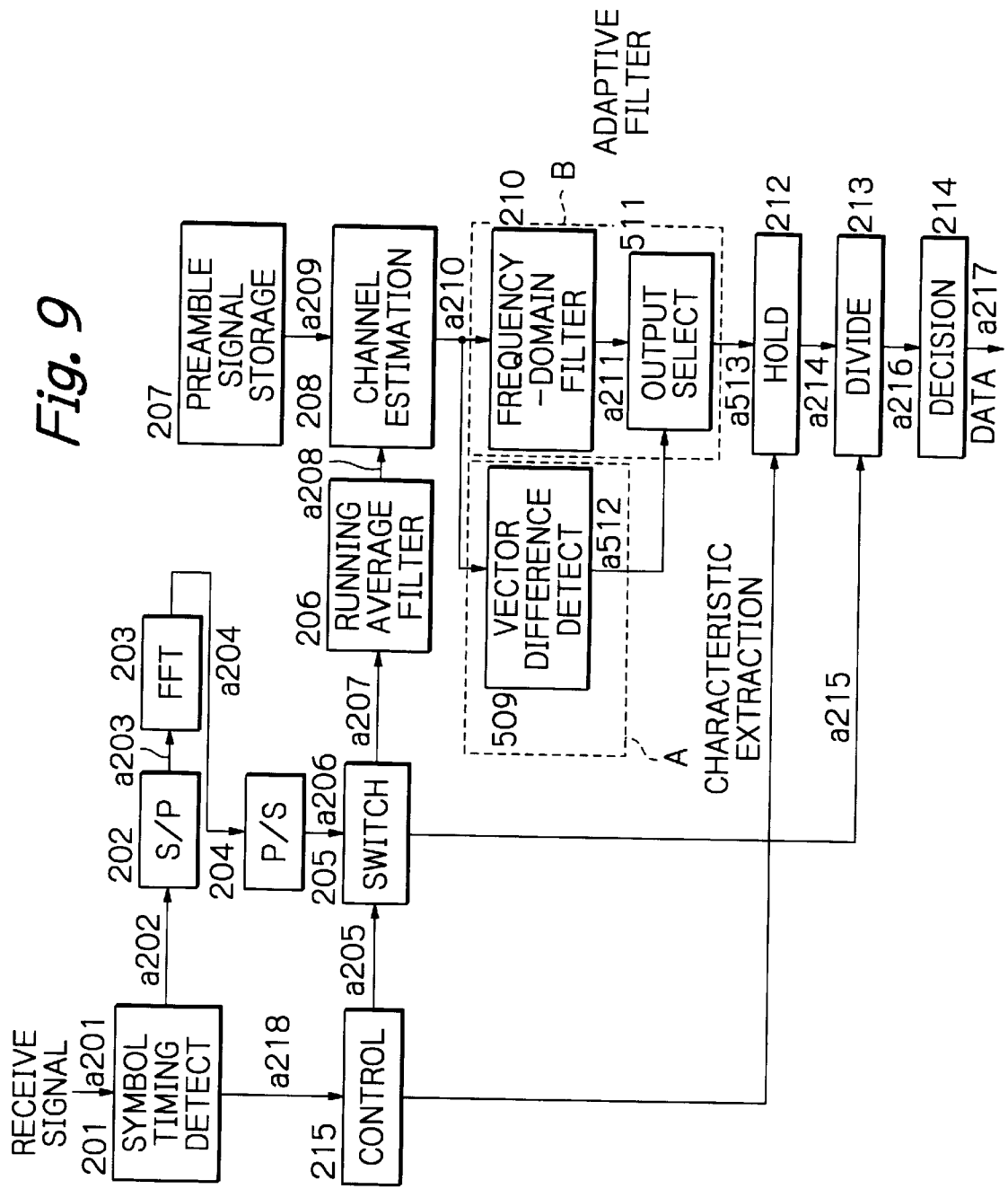
FIG. 9 is a block diagram of still another embodiment of an OFDM coherent detection system according to the present invention.

FIG. 9 shows a block diagram of still another embodiment of the present OFDM coherent detection system. The same members as those in FIG. 8 show the same members. It is assumed that the OFDM coherent detection system in FIG. 9 processes a signal having the format shown in FIG. 6.

The OFDM coherent detection system in FIG. 9 comprises a symbol timing detection circuit 201, an S/P (serial to parallel) conversion circuit 202, an FFT (Fast Fourier Transform) circuit 203, a P/S (parallel to serial) conversion circuit 204, a switching circuit 205, a running average filter 206 for two symbols, a preamble signal storage circuit 207, a channel estimation circuit 208, a vector difference detection circuit 509, a frequency-domain filter 210, an output selection circuit 511, a hold circuit 212, a division circuit 213, a decision circuit 214 and a control circuit 215.

The vector difference detection circuit 509 constitutes a characteristic extraction circuit A. The frequency-domain filter 210 and the output selection circuit 511 constitute an adaptive filter B.

In FIG. 9, the channel estimation circuit 208 carries out channel estimation based upon two input signals a208 and a209. In other words, the signal a208 which carries a preamble signal in a receive vector of a subcarrier in a receive OFDM signal is divided by a signal a209, which is provided by the preamble signal storage circuit 207 as a reference transmit vector. Thus, transfer function or attenuation in propagation path is estimated for each channel of a subcarrier.

The signal a210 which is an output of the estimation circuit 208 is applied to the vector difference detection circuit 509 and the frequency-domain filter 210. The signal a210 carries a plurality of signal components of subcarriers sequentially.

The OFDM coherent detection system in FIG. 9 has the vector difference detection circuit 509, instead of the amplitude detection circuit 409 and the phase rotation detection circuit 416 in FIG. 8.

The vector difference detection circuit 509 detects the absolute value of the vector difference of the input signal a210, without separating amplitude and phase from the vector. The vector difference detection circuit 509 provides an output signal a512 which carries a quantized value of the vector difference of signal components between a previous subcarrier and a current subcarrier. Therefore, the signal a512 is the vector difference between adjacent two subcarriers.

The output selection circuit 511 selects one of the outputs SG3, SG5 and SG7 of the frequency-domain filter 210, as shown in FIG. 2. The selected signal is the output signal a513.

Therefore, the OFDM coherent detection circuit in FIG. 9 determines the characteristic of the frequency-domain filter 210 according to the vector difference between subcarriers in the signal a210.

Therefore, the accurate estimation of each channel transfer function or attenuation is carried out, even when the variations of both the amplitude and the phase rotation between channels are large as shown in FIGS. 1 and 3.

Figure 16:
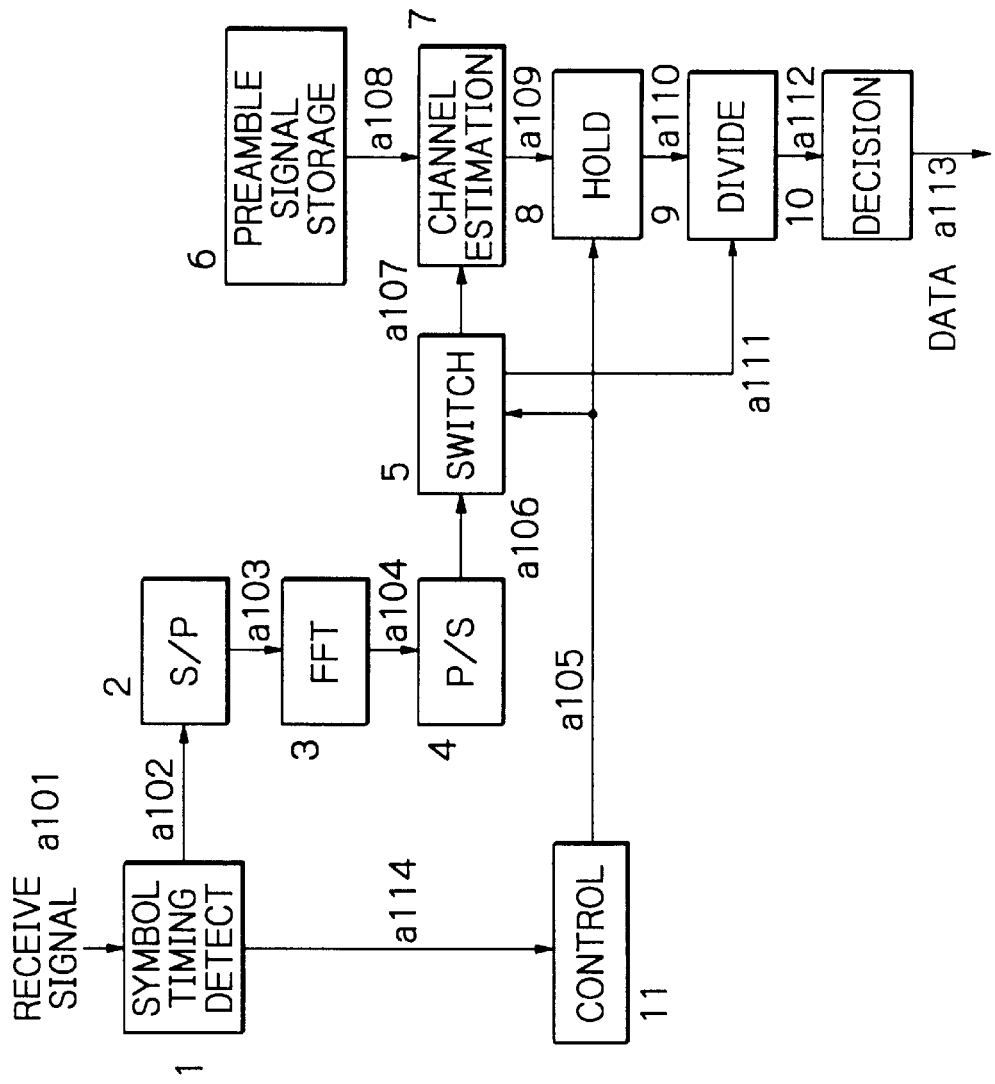
FIG. 16 is a block diagram of a prior coherent detection system.
Figure 17:
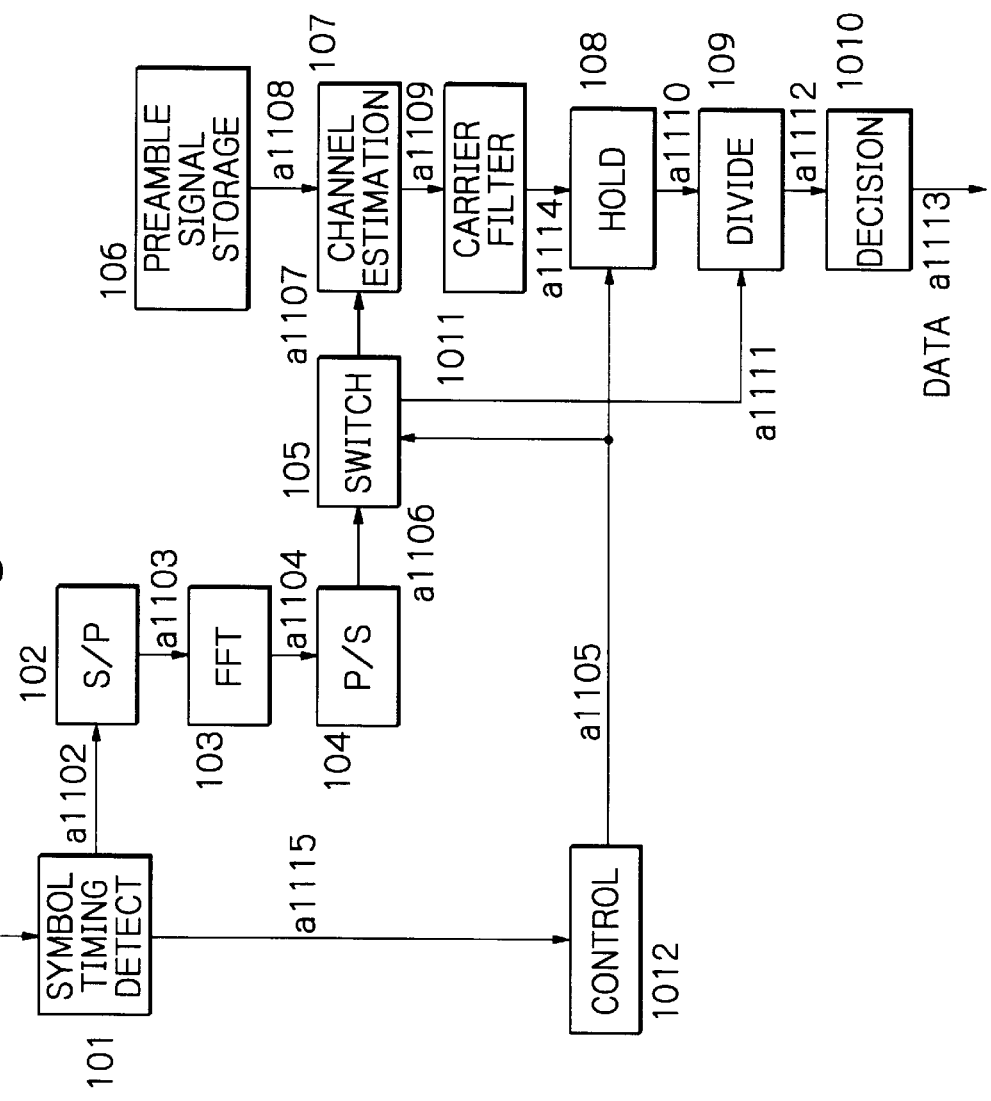
FIG. 17 is a block diagram of another prior coherent detection system.

In order to confirm the effect of the present OFDM coherent detection system, a computer simulation has been carried out. The simulation assumes the following conditions, and calculates packet error rate of the system in FIG. 8 (present invention), and FIG. 16 (prior art).

Format of receive signal; same as FIG. 6

Modulation system of subcarrier; 16 QAM

Error correction; convolutional coding with coding ratio 1/2, and decoding by Vitabi algorithm Symbol timing detection; ideal Transmit packet length; 64 bytes Transmission path assumes Rayleigh fading environment (delay spread (r.m.s.)=150 nS) of 30 waves with O.B.O (Output Back Off)=5 dB, considering non-linearity of a transmit amplifier.

Figure 10:
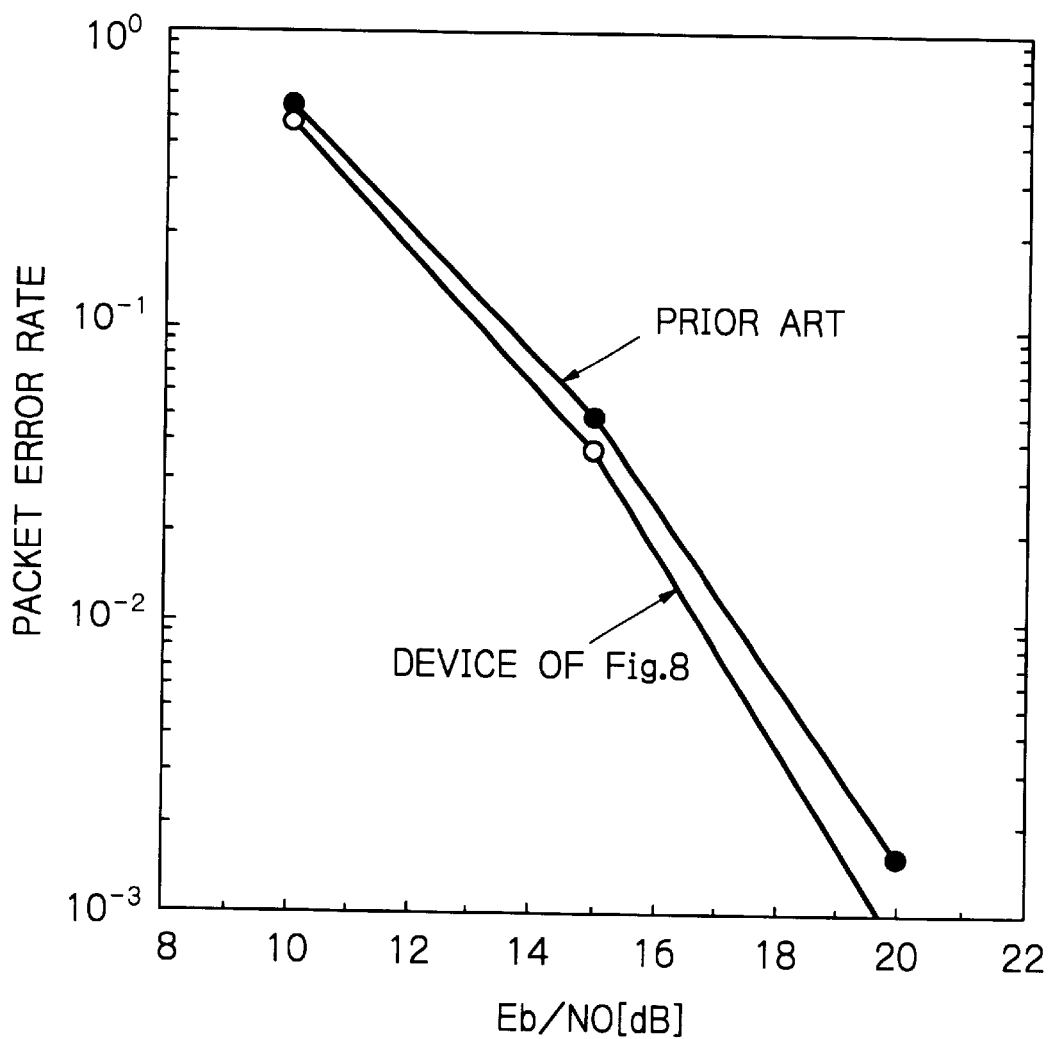
FIG. 10 shows curves indicating simulation result showing effect of the present invention.

FIG. 10 shows the result of the simulation. In FIG. 10, the horizontal axis shows Eb/No (dB) (ratio of signal energy for each bit and one-sided spectral density of additive white Gaussian noise), and the vertical axis shows packet error rate (PER).

It should be noted in FIG. 10 that the present invention has improved Eb/No by 0.5 dB when PER=0.1. Therefore, the present invention provides accurate channel estimation, suppresses degradation of PER, and improves the total performance.

Fifth Embodiment

A subcarrier No. 32 in FIG. 1 has high amplitude and large difference from that of an adjacent subcarrier. When an amplitude is high and difference from that of an adjacent subcarrier is large, if a tap coefficient of a filter is determined only depending upon amplitude, the filter would have large tap coefficient, and would not follow the frequency-domain change. Therefore, a tap coefficient must further be controlled by a characteristic value which indicates variation from an adjacent subcarrier.

Therefore, according to the present embodiment, an adaptive filter is controlled according to not only an amplitude of a subcarrier but also a vector difference between two adjacent subcarriers.

Figure 11:
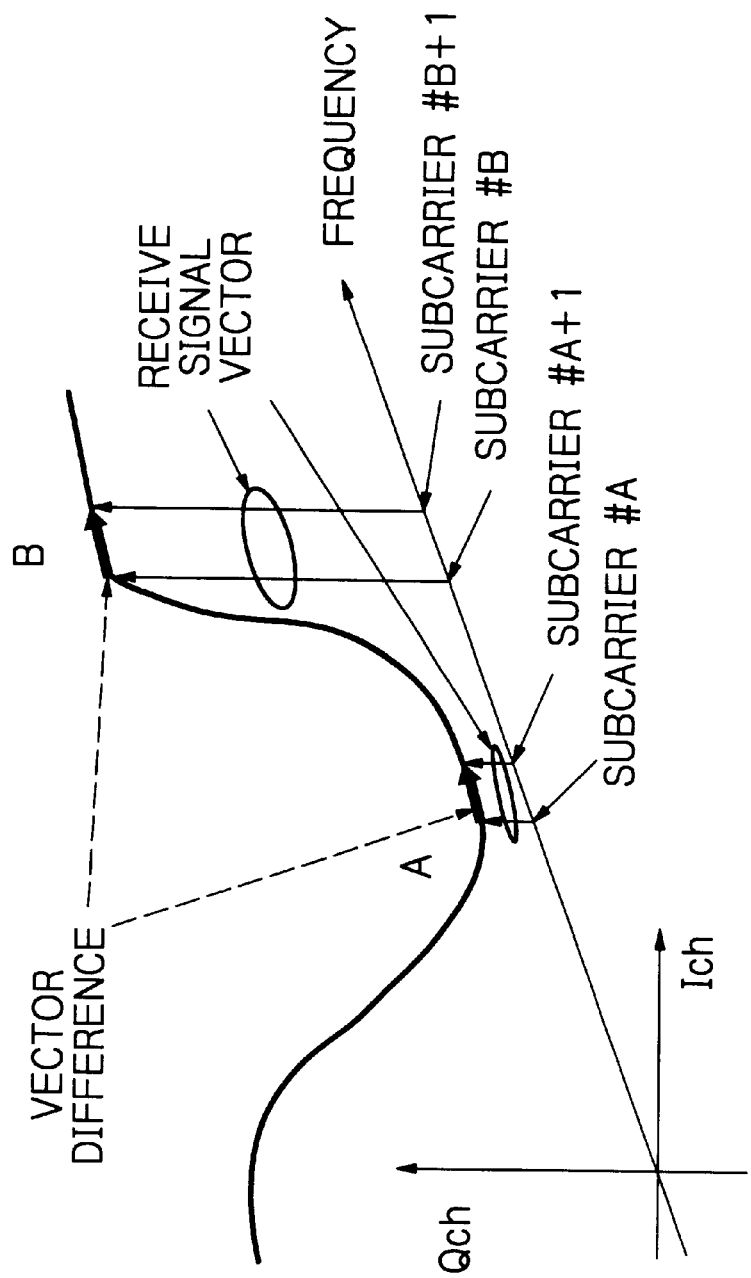
FIG. 11 is an explanatory figure of vector difference.

FIG. 11 shows an explanation of a vector difference. In FIG. 11, a signal plane is defined of each subcarrier in direction of frequency, and a receive signal vector (an estimated signal vector) is shown on the signal plane. It is assumed for simplicity that all the carriers have the signal point (Ich, Qch)=(0, 1), and suffer from only amplitude variation.

In FIG. 11, a vector difference between a subcarrier #A and a subcarrier #A+1 close to the point A, and a vector difference between a subcarrier #B and a subcarrier #B+1 close to the point B appear the same. Therefore, the present embodiment takes not only vector difference but also amplitude of a subcarrier by weighting them, so that a filter can follow the change in frequency domain even when variation of channel transfer function or attenuation in frequency domain is large and delay spread is large, and degradation of channel estimation by noise is suppressed.

FIG. 12 shows a block diagram of the current embodiment, which assumes to process a signal format of FIG. 6, and the same numerals as those in FIG. 5 show the same members.

The coherent detection system in FIG. 12 comprises a running average filter 206 of two symbols, an amplitude detection circuit 209, an vector difference detection circuit 509 a frequency-domain filter 210, a multiplier circuit 417 and an output selection circuit 211.

The running average filer 206 of two symbols receives preamble signals a207, and provides running average of two preamble signals in time axis. The amplitude detection circuit 209 receives a channel estimation signal a210, and provides amplitude detection signal a212 depending upon amplitude of the estimated channel signal. The vector difference detection circuit 509 receives the channel estimation signal a210, and provides an output signal a512 which is vector difference between a previous subcarrier and a current subcarrier. The multiplier circuit 417 receives the amplitude detection signal a212 and the vector difference detection signal a512, and provides the product of those two signals as the characteristic value of a receive packet. The frequency-domain filer 210 receives a channel estimation signal a210, and provides a three-taps output, a five-taps output and a seven-taps output as shown in FIG. 2, as filter outputs a211 (SG3, SG5, or SG7). The output selection circuit 211 selects one of the outputs of the filter depending upon the output signal a211b of the multiplier 417.

A characteristic extraction circuit A is comprised of the amplitude detection circuit 209, the vector difference detection circuit 509, and the multiplier circuit 417. An adaptive filter B is comprised of the frequency-domain filer 210 and the output selection circuit 211.

A receive signal a201 is applied to the symbol timing detection circuit 201 which detects a symbol timing. An output a202 of the symbol timing detection circuit 201 is applied to the S/P conversion circuit 202. The converted parallel signal a203 is applied to the FFT circuit 203 which carries out OFDM demodulation and provides receive vector a204 of each subcarriers. The P/S conversion circuit 204 carries out the parallel to serial conversion of a subcarrier receive vector signal a204, and provides the serial signal a206.

On the other hand, the timing signal a218 is applied to the control circuit 215, which provides a control signal a205. The control signal a205 is applied to the switching circuit 205 which carries out the switching of a preamble signal and a data signal of a receive signal, and a hold circuit 212 which holds a signal during a channel estimation signal hold time. The switching circuit 205 switches a preamble signal a207 and a data signal a215 according to the control signal a205. The preamble signal a207 is applied to the running average filter 206 which provides average of two preambles in time axis. The output a208 of the average filter 206 is applied to the channel estimation circuit 208 which carries out the channel estimation by using the reference preamble signal in the preamble signal storage circuit 207.

The channel estimation signal a210 is applied to the amplitude detection circuit 209 which measures amplitude of the estimated channel signal a210 and provides the amplitude detection signal a212. Further, the channel estimation signal a210 is applied to the vector difference detection circuit 509, which provides vector difference detection signal a512 between a previous subcarrier and a current subcarrier. The amplitude detection signal a212 and the vector difference detection signal a512 are applied to the multiplier circuit 417, which provides the characteristic value depending upon each receive packet. The channel estimation signal a210 is further applied to the frequency-domain filter 210, which provides filter outputs a211. The output selection circuit 211 selects one of the filter outputs a211 according to the product a211b of the output of the multiplier circuit 417 so that the larger the product a211b is, a filter output relating to the larger tap coefficient is selected.

The output selection signal a213 is applied to the hold circuit 212, which holds the output selection signal a213 during the channel estimation signal hold period according to the control signal. The output a214 of the hold circuit 212 is applied to the divider circuit 213 which also receives a data signal a215, so that the former signal a214 is divided by the latter signal a215 to perform coherent detection. The coherent detection signal a216 is applied to the decision circuit 214, which provides an output data a217.

Sixth Embodiment

Figures 13, 13A:
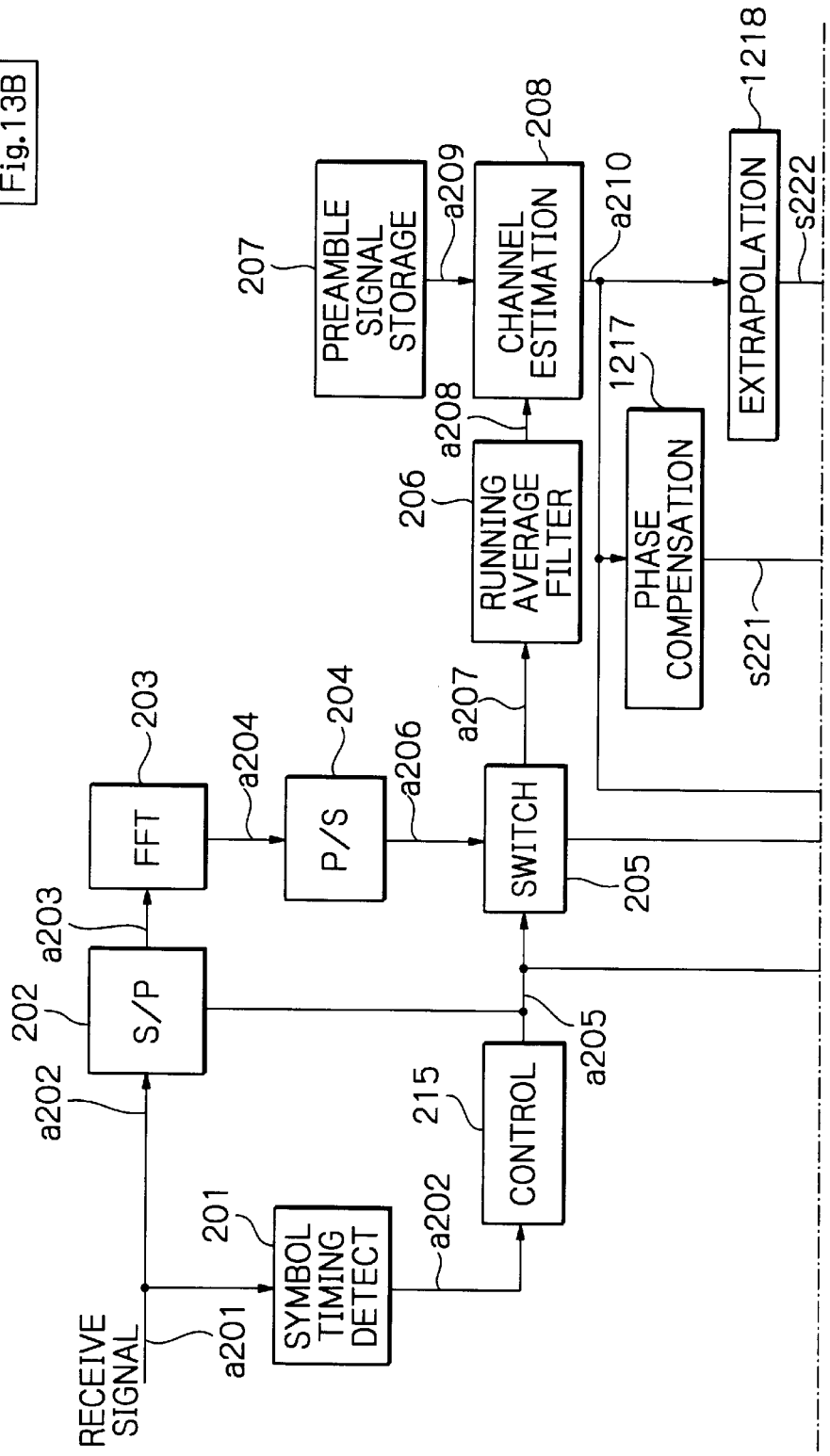
FIG. 13 is a block diagram of still another embodiment of an OFDM coherent detection system according to the present invention.
Figure 13B:
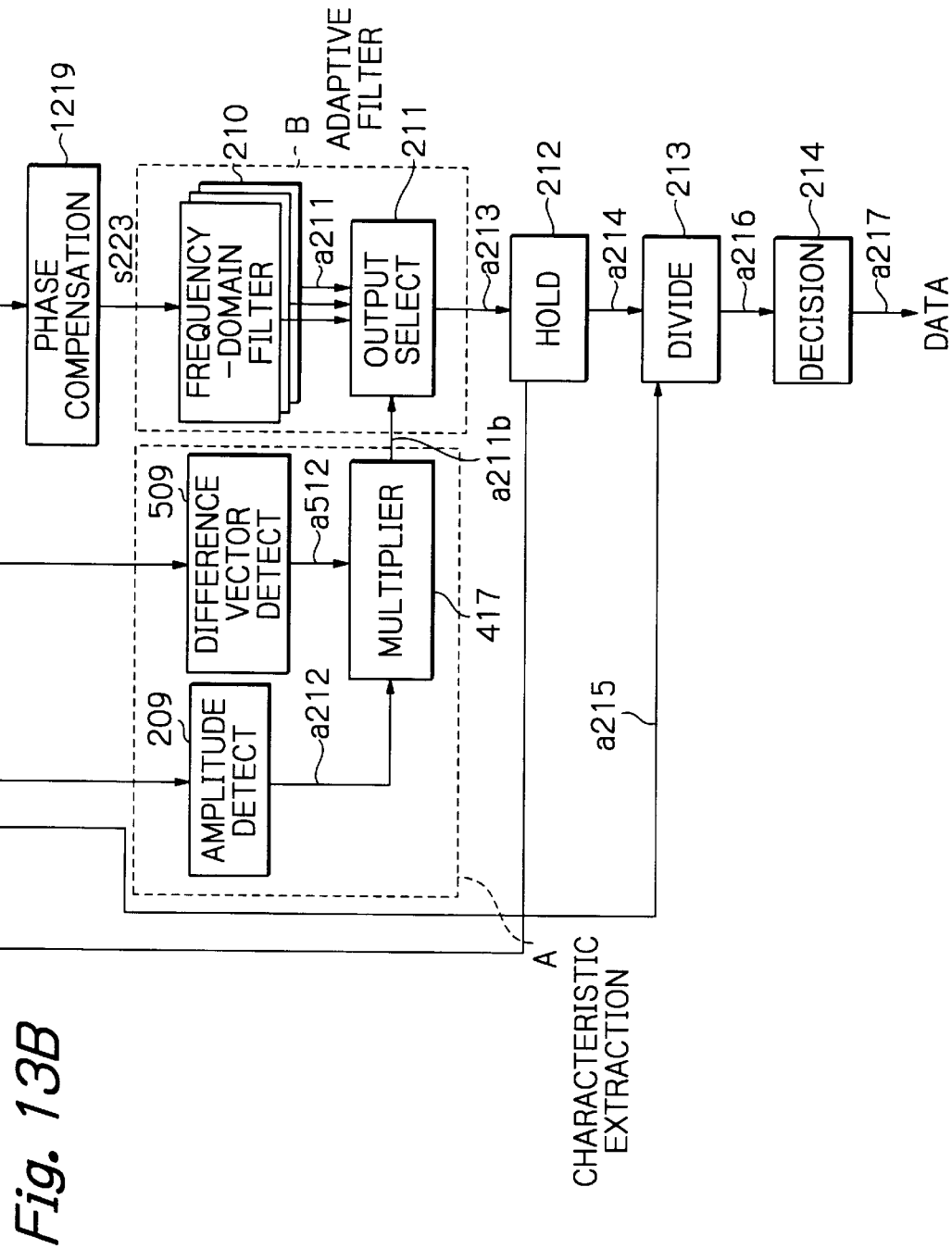

FIG. 13 is a block diagram of still another embodiment of the present coherent detection system. It is assumed that the system in FIG. 13 processes a signal format shown in FIG. 6, and the same numerals as those in the previous embodiments show the same members.

The feature of this embodiment is, first, a phase compensation circuit 1219 is provided at an input of an adaptive filter 210 so that a constant phase rotation in a signal is removed before a signal is applied to the adaptive filter 210. Another feature of this embodiment is that a phase compensated extrapolation circuit 1218 is provided at an input of said compensation circuit 1219 so that signals out of the pass band are phase-compensated and extrapolated into a signal. Said signals out of the pass band are necessary for an adaptive filter B when the adaptive filter B processes a subcarrier close to ends of the pass band. Still another feature of this embodiment is that a subcarrier phase compensation circuit 1217 is provided at an input of a characteristic extraction circuit A so that phase rotation between adjacent subcarriers is compensated for characteristic extraction.

FIG. 13 shows an embodiment that all of the phase compensation circuit 1219, the phase-compensated extrapolation circuit 1218, and the subcarrier phase compensation circuit 1217 are provided, and those features are added to the embodiment of FIG. 12. It should be noted that those features may also be added to another embodiment, for instance the embodiment of FIG. 8, and further it is possible to those skilled in the art that one or two of three features may be added to any previous embodiment.

In FIG. 13, a receive signal a201 is applied to a symbol timing detection circuit 201 for detecting a symbol timing. A timing signal a202 is applied to a control circuit 215, which provides a control signal a205. The control signal a205 determines the timing for opening a receive OFDM window, for switching a preamble part and a data part of a receive signal, and for holding a channel estimation signal. A receive signal a201 is further applied to a S/P (serial to parallel) conversion circuit 202 which outputs an OFDM symbol according to the control signal and provides an output signal a203 in parallel form. The signal a203 is applied to an FFT (Fast Fourier Transform) circuit 203 which carries out OFDM demodulation and provides a receive vector a204 of a subcarrier. A P/S (parallel to serial) conversion circuit 204 converts the signal into serial form and provides an output signal a206 in serial form. A switching circuit 205 switches the signal a206 into a preamble signal a207 and a data signal a215 according to the control signal a205. The preamble signal a207 is applied to a running average filter 206 which provides an average of two symbols on time axis. An output a208 of the running average filter 206 is applied to a channel estimation circuit 208, which further receives a reference preamble a209 from a preamble signal storage circuit 207, and carries out channel estimation. A channel estimation signal a210 is applied to an amplitude detection circuit 209. Further a channel estimation signal a210 is applied to a subcarrier phase compensation circuit 1217 which carries out the phase compensation according to the following equation, and provides a phase compensation signal s221.

$$r_i = P_i - P_{i-1} e^{-j\theta}$$

where $P_i$ is a receive signal of each subcarrier, and $\theta$ is phase rotation between adjacent two subcarriers.

The channel estimation signal a210 is further applied to the phase-compensated extrapolation circuit 1218, which extrapolates a signal out of the pass band by using the most extreme subcarriers for the filter process, and then phase of each extrapolated signal is compensated.

The extrapolated signal s222 is applied to the phase compensation circuit 1219 which compensates constant phase error, and provides the phase compensated output signal s223 to the frequency-domain filter 210. The frequency-domain filter 210 provides the smoothed filter output a211 in frequency axis.

The amplitude detection circuit 209 detects the amplitude of the estimated signal a210, and provides the amplitude detection signal a212. The phase compensated signal s221 is applied to the vector difference detection circuit 509, which provides the vector difference output a512 between a previous subcarrier and a current subcarrier. The amplitude detection signal a212 and the vector difference detection signal a512 are applied to the multiplier 417, which provides the characteristic value of a receive packet by the product of two inputs. The output selection circuit 211 selects one of the filter outputs according to the output a211b of the multiplier 417. Then, the selected signal a213 is applied to the hold circuit 212, which holds the selected output signal a213 for channel estimation signal hold period according to the control signal a205. The output a214 of the hold circuit 212 is applied to the divider circuit 213, which also receives a data signal a215, and provides the equalization of an input channel transfer function, or coherent detection. The coherent detection signal a216 is applied to the decision circuit 214, which decides a data (1 or 0) and provides an output data a217.

Seventh Embodiment

Figure 14:
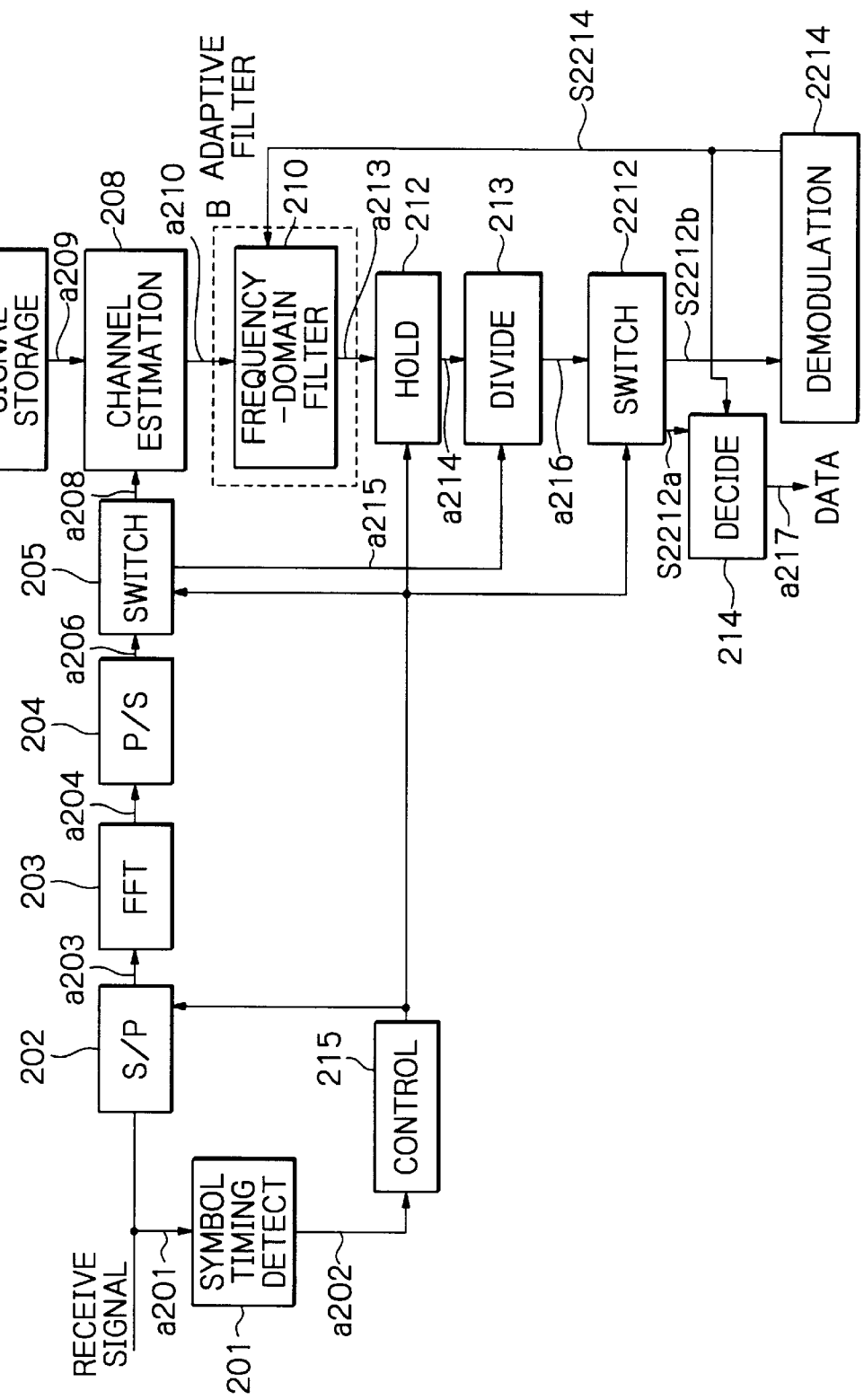
FIG. 14 is a block diagram of still another embodiment of an OFDM coherent detection system according to the present invention.

FIG. 14 shows a block diagram of still another embodiment of the present coherent detection system. The same numerals as those in the previous embodiments show the same members.

The feature of the embodiment in FIG. 14 is that an adaptive filter B is controlled according to modulation system of each subcarrier. For instance, when a number of multiplicity n of modulation is large (when a number n of nQAM modulation system is large), an adaptive filter is controlled so that a bandwidth of the filter is wide.

Figure 15:
FIG. 15 shows a format of a packet signal used in the embodiment in FIG. 14.

It is assumed in the present embodiment that a preamble signal as shown in FIG. 15 is used for channel estimation. In FIG. 15, an information indicating modulation system of a subcarrier is transmitted from a transmit side.

In FIG. 14, a receive signal a201 is applied to a symbol timing detection circuit 201 which detects symbol timing. The timing detection signal a202 is applied to a control circuit 215, which provides a control signal. The control signal is used for determining to open a receive OFDM window, a timing to switch a receive signal into a preamble part and a data part, and a period to keep a channel estimation signal. A receive signal a201 is further applied to a S/P (serial to parallel) conversion circuit 202 which outputs OFDM, symbol according to the control signal. The S/P conversion signal a203 is applied to an FFT (Fast Fourier Transform) circuit 203 for OFDM demodulation, and provides a subcarrier receive vector signal a204. A P/S (parallel to serial) conversion circuit 204 converts a subcarrier receive vector signal in parallel form into serial form, and provides the converted serial output signal a206. The switching circuit 205 switches a receive signal into a preamble signal a208 and the other signal a215.

The channel estimation circuit 208 carries out the channel estimation by using a reference preamble signal a209 stored in the preamble signal storage circuit 207, and provides channel transfer function or attenuation a210 of each subcarrier. The channel estimation is possible not only by using only a preamble signal, but also by first estimation of channel transfer function or attenuation by using a preamble signal and secondly updating the estimated value by using a data after data decision through reverse modulation. The channel estimation signal a210 is applied to the frequency-domain filter 210, and an output a213 of the frequency-domain filter 210 is applied to a hold circuit 212. The hold circuit 212 keeps an output a213 of the filter 210 for hold time of channel estimation signal according to the control signal. The divider circuit 213 receives a signal a215 which excludes a preamble signal and an output signal a214 of the hold circuit 212, and carries out channel equalization or coherent detection, and provides a coherent detection signal a216. The switching circuit 2212 switches a coherent detected signal into an information s2212b which shows subcarrier modulation system and data signal s2212a. The information s2212b of the subcarrier modulation system is applied to a demodulation circuit 2214 of a subcarrier modulation system to measure the modulation system of subcarriers. The measured modulation system is an output signal s2214, which is applied to the frequency-domain filter 210 for selecting tap coefficients.

EFFECT OF THE INVENTION

As described above in detail, according to the present multicarrier coherent detection system, a filter output is selected according to actual environment of each channel, and therefore, an accurate channel estimation is obtained as compared with a prior art. Therefore, an improved coherent detection system is obtained with a little increase of size of a circuit.

From the foregoing it will now be apparent that a new and improved multicarrier coherent detection system has been found. It should be appreciated of course that the embodiments disclosed are merely illustrative and are not intended to limit the scope of the invention. Reference should be made to the appended claims, therefore, for indicating the scope of the invention.

What is claimed is:

1. A coherent detection system for multicarrier modulation system comprising;
    A Fourier transform circuit for receiving multicarrier modulation signal modulated with a plurality of subcarriers, carrying out block demodulation of said multicarrier modulation signal so that receive vector signal of each subcarriers is obtained,
    a channel estimation means which divides said receive vector signal of each subcarriers of an output of said Fourier transform circuit, by a reference transmit vector signal or a transmit vector obtained by demodulation of a receive signal, so that transfer function or attenuation of each subcarriers on propagation is estimated,
    a filter means for smoothing estimated channel transfer function or attenuation from said channel estimation means among subcarriers,
    a divider means for dividing said receive vector signal by estimated channel transfer function or attenuation from said filter means so that said receive vector signal is coherent detected, characterized in that
    said filter means is an adaptive filter constituted by a transversal filter providing a plurality of outputs each related to at least one of a number of taps and tap coefficient of each taps,
    a characteristic extraction circuit receiving estimated channel attenuation of each subcarriers obtained by said channel estimation means is provided,
    a selection circuit for selecting one of said outputs of said filter means is provided,
    wherein said selection circuit selects one of outputs of said adaptive filter for each subcarriers according to an output of said characteristic extraction circuit so that channel estimation for each subcarriers is improved.

2. A multicarrier coherent detection system according to claim 1, wherein said characteristic extraction circuit provides estimated amplitude of each subcarriers.

3. A multicarrier coherent detection system according to claim 1, wherein said characteristic extraction circuit provides estimated phase rotation between adjacent subcarriers.

4. A multicarrier coherent detection system according to claim 1, wherein said characteristic extraction circuit provides product of estimated amplitude and estimated phase rotation of each subcarriers.

5. A multicarrier coherent detection system according to claim 1, wherein said characteristic extraction circuit provides vector difference between adjacent subcarriers.

6. A multicarrier coherent detection system according to claim 1, wherein said characteristic extraction circuit provides product of estimated amplitude of each subcarriers and vector difference between adjacent subcarriers.

7. A multicarrier coherent detection system according to claim 1, wherein said selection circuit selects an output of said adaptive filter so that the larger an output of said characteristic extraction circuit is, the larger tap coefficient of said adative filter is.

8. A multicarrier coherent detection system according to claim 1, wherein a symbol timing detection circuit for detecting symbol timing in said multicarrier modulation signal is provided, and said Fourier transform circuit operates to a multicarrier modulation signal which a symbol timing is detected.

9. A multicarrier coherent detection system according to claim 8, wherein a phase compensation means is provided between said channel estimation means and said adaptive filter, so that said phase compensation means receives estimated channel attenuation of an output of said channel estimation means, compensating constant phase rotation of an input signal of the phase compensation means due to an error of an OFDM symbol timing window in said symbol timing detection circuit, and applying an output of the phase compensation means to an input of said adaptive filter.

10. A multicarrier coherent detection system according to claim 8, wherein;
    a phase-compensated extrapolation means and a phase compensation means are provided between said channel estimation means and said adaptive filter,
    said phase-compensated extrapolation means receives said estimated channel attenuation of subcarriers at extreme ends in pass band, effecting phase compensation to a received signal according to constant phase error between subcarriers due to an error of an OFDM symbol detection window in said symbol timing detection means, and extrapolates phase compensated signal, when signals out of the pass band is requested in said adaptive filter for processing a subcarrier close to end of the pass band, said phase compensation means receives estimated channel attenuation within the pass band and extrapolated signals out of the pass band provided by said phase-compensated extrapolation means, effecting compensation of constant phase rotation in received signals, and applying phase compensated signals to said adaptive filter.

11. A multicarrier coherent detection system according to claim 8, wherein a characteristic value compensation means (1217) is provided between said channel estimation means (208) and said characteristic extraction means (A), so that said characteristic value compensation means (1217) receives an output of said channel estimation means (208) including constant phase error due to OFDM symbol detection window error in said symbol timing detection means, compensating said constant phase error and applying phase compensated signal to said characteristic extraction means (A).

12. A multicarrier coherent detection system according to claim 1, wherein;

an extrapolation means is provided between said channel estimation means and said adaptive filter, said extrapolation means receives said estimated channel attenuation of subcarriers, and extrapolates said estimated channel attenuation of subcarriers at extreme ends in pass band, when signals out of the pass band is requested in said adaptive filter for processing a subcarrier close to end of the pass band.

13. A multicarrier coherent detection system according to claim 1, wherein said adaptive filter means is controlled by a measured signal of modulation system of each subcarrier.

14. A multicarrier coherent detection system according to any of of claims 1–13, wherein said adaptive filter means is a transversal filter which controls bandwidth of the filter by a number of taps and tap coefficient of each taps of the filter.

* * * * *